United States Patent
Kuempel et al.

(10) Patent No.: US 12,108,913 B2
(45) Date of Patent: Oct. 8, 2024

(54) COFFEE GRINDER

(71) Applicant: Fellow Industries, Inc., San Francisco, CA (US)

(72) Inventors: Jeremy Kuempel, Brisbane, CA (US); Jake Miller, San Francisco, CA (US)

(73) Assignee: Fellow Industries, Inc., San Francisco, CA (US)

( * ) Notice: Subject to any disclaimer, the term of this patent is extended or adjusted under 35 U.S.C. 154(b) by 172 days.

(21) Appl. No.: 17/782,961

(22) PCT Filed: Dec. 6, 2020

(86) PCT No.: PCT/US2020/063520
§ 371 (c)(1),
(2) Date: Jun. 6, 2022

(87) PCT Pub. No.: WO2021/113790
PCT Pub. Date: Jun. 10, 2021

(65) Prior Publication Data
US 2023/0017935 A1    Jan. 19, 2023

Related U.S. Application Data

(60) Provisional application No. 62/945,054, filed on Dec. 6, 2019.

(51) Int. Cl.
*A47J 42/42* (2006.01)
*A47J 42/16* (2006.01)
(Continued)

(52) U.S. Cl.
CPC .............. *A47J 42/42* (2013.01); *A47J 42/44* (2013.01); *A47J 42/46* (2013.01); *A47J 42/56* (2013.01)

(58) Field of Classification Search
CPC ............. A47J 42/42; A47J 42/40; A47J 42/38
See application file for complete search history.

(56) References Cited

U.S. PATENT DOCUMENTS

| 5,386,944 A * | 2/1995 | Knepler ................ G01G 19/52 241/34 |
| 2007/0187534 A1* | 8/2007 | Anson .................... A47J 42/46 241/92 |

(Continued)

FOREIGN PATENT DOCUMENTS

| EP | 3248521 A1 | 11/2017 |
| KR | 101939690 B1 * | 1/2019 |
| WO | 2018/211264 A1 | 11/2018 |

OTHER PUBLICATIONS

English translate (KR101939690B1), retrieved date Jun. 15, 2024.*

*Primary Examiner* — Mohammed S. Alawadi
(74) *Attorney, Agent, or Firm* — Cognition IP, P.C.; Edward Steakley; Justin White

(57) ABSTRACT

A coffee grinder suitable for home use can include a housing that receives coffee beans, a grinding component within the housing, a removable container that receives coffee grounds dispensed from the grinding component, and a base located beneath the grinding component that supports the container. Magnetic components in the base and removable container can optimally align the container when placed atop the base. A knocker system can dislodge ground coffee residue into the container when actuated. An intelligent drive system can utilize feedback to drive the grinding component at a constant speed to minimize coffee grounds size variances. A grinds chamber in the housing can define an asymmetrical cross-sectional geometry. An auger that drives the grinding component can have an outer thread that forces coffee beans (Continued)

through the grinds chamber, and a grinds chamber housing can include a protective shoulder that covers a lead-in portion of the outer thread.

19 Claims, 15 Drawing Sheets

(51) Int. Cl.
*A47J 42/40* (2006.01)
*A47J 42/44* (2006.01)
*A47J 42/46* (2006.01)
*A47J 42/56* (2006.01)

(56) References Cited

U.S. PATENT DOCUMENTS

| | | | | |
|---|---|---|---|---|
| 2013/0001339 A1* | 1/2013 | Hoare | ............ | A47J 42/44 |
| | | | | 241/101.3 |
| 2017/0164786 A1* | 6/2017 | Camitta | ............ | A24B 7/06 |

* cited by examiner

COFFEE GRINDER

CROSS-REFERENCE TO RELATED APPLICATIONS

This application claims the benefit of U.S. Provisional Application No. 62/945,054 filed Dec. 6, 2019, which is hereby incorporated by reference in its entirety.

TECHNICAL FIELD

The present disclosure relates generally to coffee related products, and more particularly to coffee grinders suitable for home use.

BACKGROUND

Coffee aficionados currently have many ways of procuring high quality coffee to meet their consumption desires. Coffee shops can have different types of coffee of varying qualities, while grocery stores and specialty coffee shops provide already ground coffee for users to brew or otherwise craft their own coffee at home. For those who like to take home whole coffee beans, there are many coffee related products that can be used in homes and other small environments to grind their own beans and craft their own coffee in different ways. Such products can include simple and moderately complex home coffee grinders that allow users to experiment with a wide array of ordinary and exotic coffee bean varieties.

Unfortunately, simpler coffee grinders intended for home use often do not have all of the features and abilities of expensive industrial and commercial coffee grinders in high volume production and sophisticated coffee shop environments. For example, despite the fact that size consistency can be a significant factor in the quality of the crafted coffee, many home use coffee grinders are not able to grind coffee beans to a consistently ground size across all particles. Rather, these products tend to produce coffee grounds that can vary in size by as much as 1000 microns or more across a single ground batch. As another example, many home coffee grinders tend to have residue that is left behind from one ground batch to another, with such residue then leading to messes or affecting the purity of future ground batches.

Although traditional ways of grinding coffee beans at home have worked well in the past, improvements are always helpful. In particular, what is desired are high quality coffee grinders that produce consistently sized coffee grounds, that contain minimal coffee residues between batches, and that are still suitable for use in home or other small environments.

SUMMARY

It is an advantage of the present disclosure to provide high quality coffee grinders that are suitable for home use and other small environments. The disclosed features, apparatuses, systems, and methods provide high quality home coffee grinders that produce consistently sized coffee grounds, that contain minimal coffee residues between batches, and that are less likely to create inconvenient messes, among other favorable results. These advantages can be accomplished at least in part by utilizing coffee grinder components that may include a magnetic catch, a knocker system, an intelligent drive system, an auger with a protected lead-in thread region, and/or an asymmetrically shaped grinds chamber, as well as other possible components, features, and details.

In various embodiments of the present disclosure, an apparatus can include a housing configured to receive coffee beans, a grinding component located within the housing and configured to grind coffee beans received in the housing into coffee grounds, a removable container or "catch" located beneath the grinding component and configured to receive coffee grounds dispensed from the grinding component, and a base located beneath the grinding component and configured to support the removable container at an upper surface thereof. The removable container can include one or more sides, a bottom, and a first magnetic component, while the base can include a second magnetic component that is configured to interact with the first magnetic component to align automatically the removable container with respect to the grinding component when the removable container is placed atop the base.

Additional embodiments of the present disclosure can include an apparatus having a housing configured to receive coffee beans, a grinding component located within the housing and configured to grind coffee beans received in the housing into coffee grounds, a container located beneath the grinding component and configured to receive coffee grounds dispensed from the grinding component, and a knocker system configured to dislodge ground coffee residue into the container when the knocker system is actuated. The ground coffee residue can be dislodged from the grinding component, a region between the grinding component and the container, or both.

In further embodiments of the present disclosure, an apparatus can include a housing configured to receive coffee beans, a grinding component located within the housing and configured to grind coffee beans received in the housing into coffee grounds, a container located beneath the grinding component and configured to receive coffee grounds dispensed from the grinding component, and an intelligent drive system configured to drive the grinding component. The intelligent drive system can utilize feedback during a grinding process so that the apparatus produces a batch of coffee grounds having an overall size variance that is less than about 400 microns.

In still further embodiments of the present disclosure, an apparatus can include a housing configured to receive coffee beans, a grinding component located within a grinds chamber inside the housing and configured to grind coffee beans received in the housing into coffee grounds, a container located beneath the grinding component and configured to receive coffee grounds dispensed from the grinding component, an auger configured to rotationally drive the grinding component, and a grinds chamber housing around at least a portion of the grinds chamber. The auger can include an outer thread that forces coffee beans through the grinds chamber when the auger rotates, and the grinds chamber housing can include a protective shoulder that covers a lead-in portion of the outer thread such that coffee beans do not contact the lead-in portion during a grinding process.

Yet additional embodiments of the present disclosure can include an apparatus having a housing configured to receive coffee beans, a grinding component located within the housing and configured to grind coffee beans received in the housing into coffee grounds, a container located beneath the grinding component and configured to receive coffee grounds dispensed from the grinding component, and a grinds chamber surrounding at least a portion of the grinding component, wherein the grinds chamber defines a cross-sectional shape that is asymmetrical.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed systems, apparatuses, features, and methods for a coffee grinder suitable for home use. These drawings in no way limit any changes in form and detail that may be made to the disclosure by one skilled in the art without departing from the spirit and scope of the disclosure.

DETAILED DESCRIPTION

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to systems, apparatuses, features, and methods for a high-quality coffee grinder suitable for home use. The disclosed systems, apparatuses, features, and methods can allow for grinding coffee beans at home or another small environment without resulting in uneven grinding, high variances across coffee ground sizes, undesirable messes, or significant residue carrying over from one grind batch to another. In particular, the disclosed features and devices can include a dual burr coffee grinder having a knocker system, a magnetic catch, an intelligent drive system, a protected auger thread lead-in, an asymmetrical grinds chamber, and/or a grinds chamber slide portion, among many other features.

Although the various embodiments disclosed herein focus on a dual burr coffee grinder suitable for home use for purposes of simplicity in illustration, it will be readily appreciated that the disclosed systems, apparatuses, features, and methods can similarly be used for industrial grade coffee grinders, high-end commercial coffee grinders, and many other food processing or grinding applications. For example, disclosed coffee grinder features such as a magnetic catch, a knocker system, an intelligent drive system, an auger with a protected lead-in thread region, and/or an asymmetrically shaped grinds chamber can be used individually or in any combination for home coffee grinders, and can also be used individually or in any combination for large commercial or industrial grinding applications.

Figure 1:
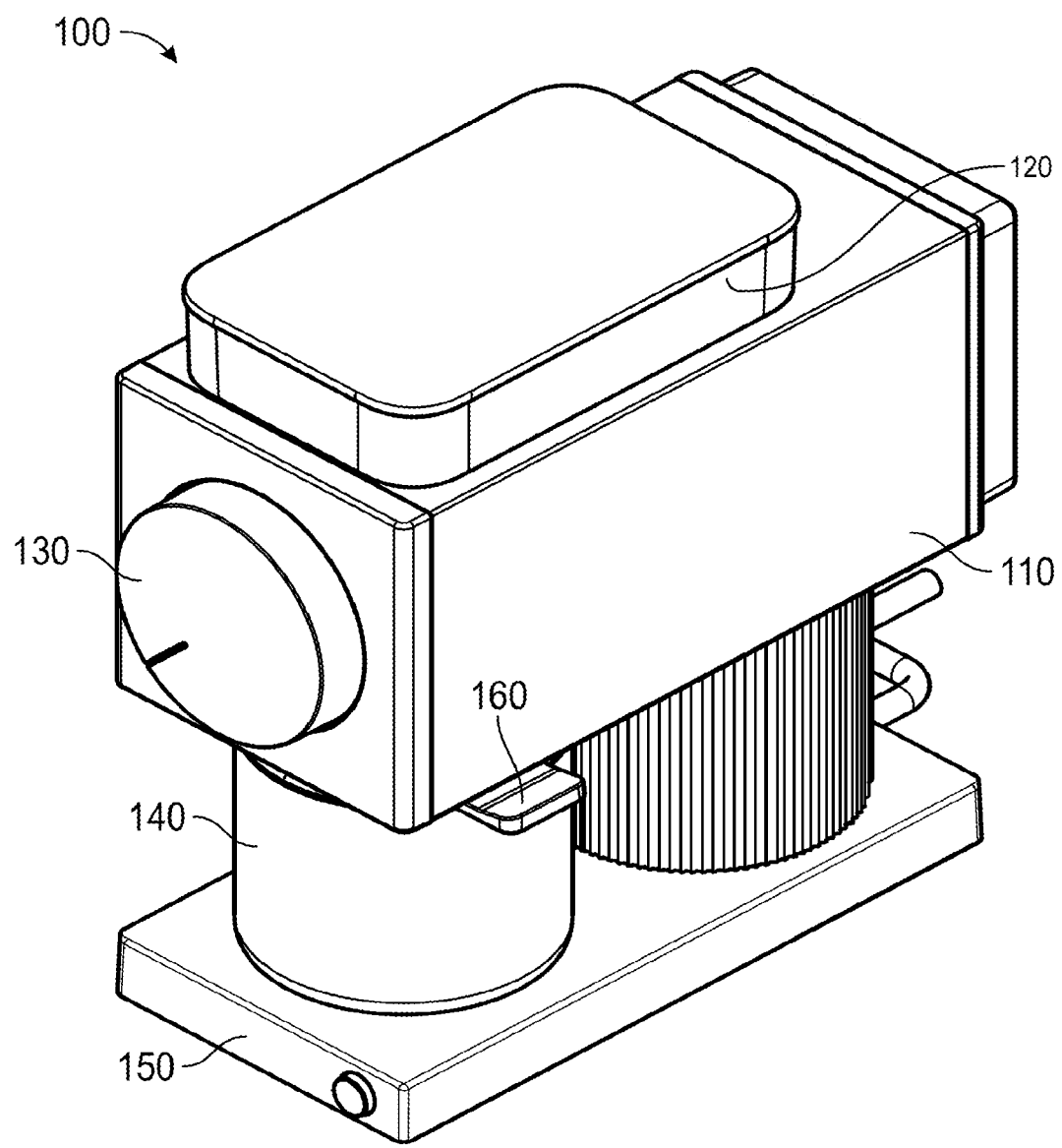
FIG. 1 illustrates in perspective view an example coffee grinder according to one embodiment of the present disclosure.

Referring first to FIG. 1, an example coffee grinder according to one embodiment of the present disclosure is illustrated in front perspective view. Coffee grinder 100 can include various components, such as an outer housing 110, a load chute 120, a grinds knob 130, a removable container 140, a base 150, and a knocker system lever 160, among other possible items. Each of these components can include various parts and features, many of which are described in greater detail below.

Figure 2A:
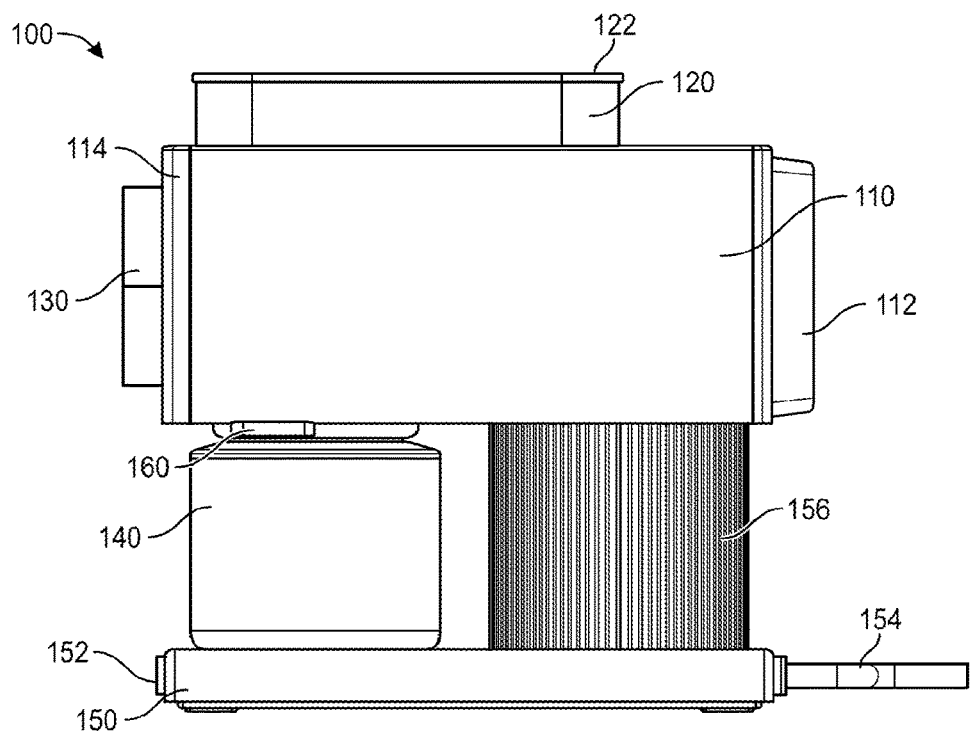
FIG. 2A illustrates in side elevation view the example coffee grinder of FIG. 1 according to one embodiment of the present disclosure.
Figure 2B:
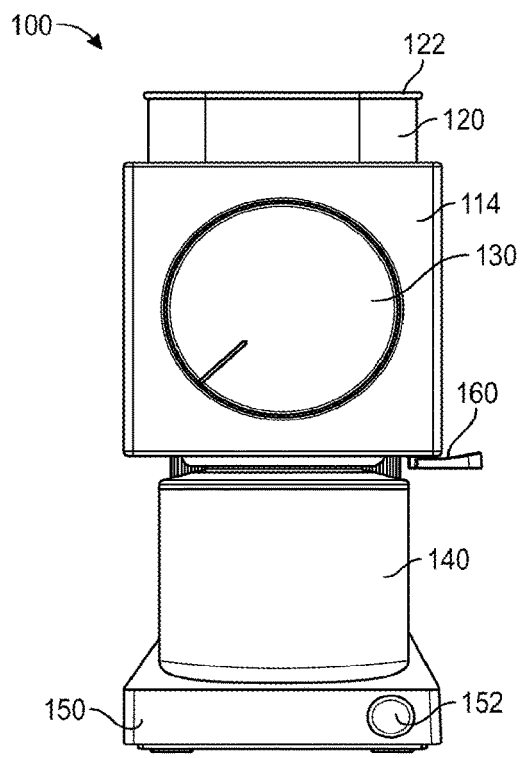
FIG. 2B illustrates in front elevation view the example coffee grinder of FIG. 1 according to one embodiment of the present disclosure.
Figure 2C:
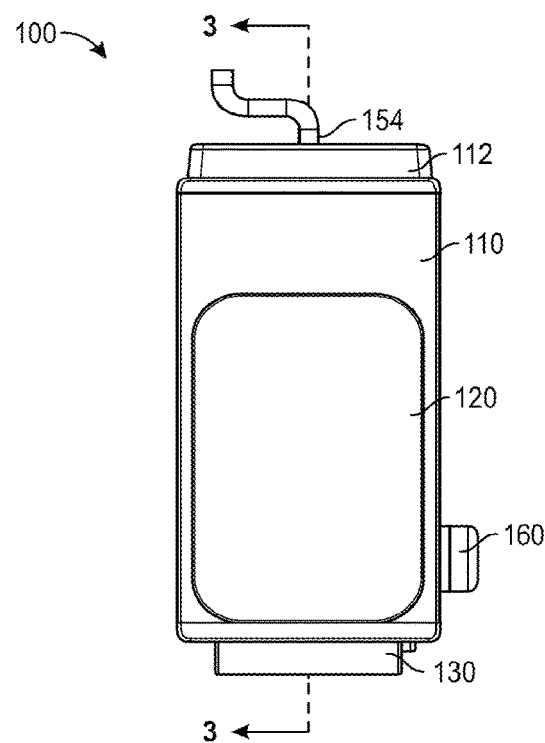
FIG. 2C illustrates in top plan view the example coffee grinder of FIG. 1 according to one embodiment of the present disclosure.

Continuing with FIGS. 2A-2C, the example coffee grinder of FIG. 1 is shown in side elevation view, front elevation view, and top plan view respectively. In addition to the foregoing components, coffee grinder 100 can include a textured rear housing cap 112 and a front housing cap 114 coupled to the outer housing 110, a thin removable lid 121 located atop the load chute 120, and a power button 152, a power cord 154, and a support column 156 located about the base 150. Support column 156 can serve to support all upper components, and may also house an internal processor, power components, and other related items. Although shown as having a scalloped and circular shape, it will be readily appreciated that support column can have many other designs and shapes.

Power button 152 can be located along a side of base 150 to reduce grinds residue and other messes that might be greater and more likely to contaminate the button if it were at an upper surface location of the base 150. Power button 152 can allow for a single touch operation to start the grinding process, which then stops automatically when the coffee grinder detects that there are no beans left to grind. Such detection can be by way of the intelligent drive system detailed below. For example, the intelligent drive system can include a sensor that detects increased rotational speeds that reflect when no load is being applied to the grinding system. In the event that no load is detected when power button 152 is first pressed, then the coffee grinder 100 can run for a set short amount of time before automatically stopping, such as ten seconds for example. As an additional function, coffee grinder 100 may continue to run as long as power button 152 is continuously pressed.

Figure 3:
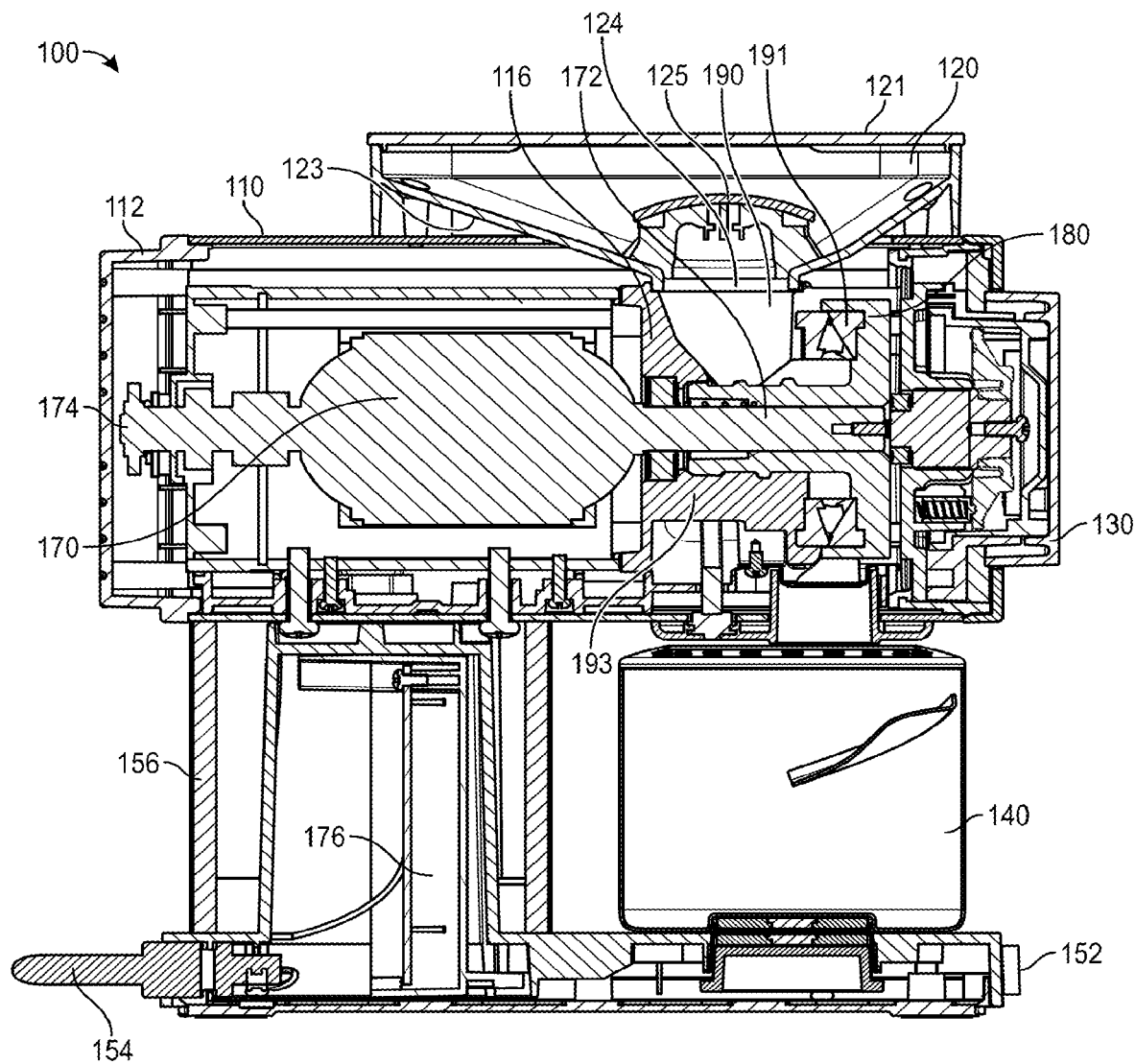
FIG. 3 illustrates in side cross-sectional view the example coffee grinder of FIG. 1 according to one embodiment of the present disclosure.

FIG. 3 illustrates in side cross-sectional view the example coffee grinder of FIG. 1. Various internal components and features of coffee grinder 100 are shown along the side cross-section 3 depicted in FIG. 2C. Load chute 120 essentially forms a small hopper that is configured to receive coffee beans when lid 121 is removed. In some embodiments, load chute 120 can hold up to 80 grams of coffee beans, since it may be desirable to grind fresh beans only in small batches and not leave coffee grounds in the load chute. Of course, smaller or larger load chute sizes may also be used. In various embodiments, lid 121 can have a layer of sound insulation added thereto, such that sound can be dampened for a quieter grinding process. A sound insulation layer can also be added to the walls of load chute 120, as well as one or more regions of outer housing 110 for similar sound dampening effects. The bottom walls 123 of load chute 120 slope downward, such that received coffee beans slide downward and fall through opening 124 beneath umbrella cover 125. This umbrella cover 125 can shield auger 180, protective shoulder 116, grinds chamber 190, and other internal components from any coffee beans or foreign objects dropping from a significant height directly onto and damaging such internal components.

An intelligent drive system can function to drive the auger 180, which can be at least partially contained within a grinds chamber housing 193. The auger 180 can be coupled to and in turn drive a grinding component during a coffee bean grinding process. Such a grinding component can be, for example, a moving burr 191 that is part of a parallel dual burr grinding system. A corresponding stationary burr, the auger 180, and other drive components can also be considered grinding components for purposes of discussion herein. In various embodiments, the intelligent drive system can utilize feedback during a grinding process so that the coffee grinder 100 produces a batch of coffee grounds having an overall size variance that is less than about 400 microns. The intelligent drive system can achieve this result by spinning the grinding component at a constant speed for a more consistent grind size across all coffee grounds. For example, a constant rotational speed of about 1200 revolutions per minute ("RPM") has been found to be a suitable speed for a consistent grind.

Of course, the level of constant rotational speed can be different as may be desired for a given design. For example, a constant rotational speed of anywhere from 1000 RPM to 2000 RPM for a single grinding session may also be suitable. A constant rotational speed can be accomplished by varying the torque applied to the drive shaft and thus the grinding component at different times during the grinding process. In contrast, simpler coffee grinders typically operate at a constant torque input, which then results in a varying rotational speed of about 1600-3500 RPM across a single grinding session depending on the amount of load created by the coffee beans being ground, which varying rotational speeds results in greater size variances and lower quality across a single batch of coffee grounds.

The intelligent drive system can include a rotational motor 170, an elongated drive shaft 172 coupled to the motor 170 and the auger 180, a sensor 174 located proximate the drive shaft and configured to detect the rotational speed of the drive shaft, and a processor 176 in communication with both the motor and the sensor. The motor 170 can be configured to rotate the drive shaft 172 in at least a forward drive direction. The drive shaft 172 can be elongated in order to reduce the potential amount of angular misalignment at the location of moving burr 191. Bearings at the front and rear of drive shaft 172 can assist in reducing any amount of angular misalignment for the burrs. In various embodiments, the processor 176 can be configured to receive an input signal from the sensor 174 regarding a rotational speed of the drive shaft 172 and send an output signal to the rotational motor 170 to adjust a power output of the motor in response to the input signal. With the sensor 174 monitoring the speed of the drive shaft 172 and providing feedback to the processor 176, the processor can instruct the motor 170 increase or decrease its power output to maintain constant speed.

In various embodiments, the motor can be a direct current ("DC") electric motor, the sensor can be a Hall effect sensor, and the processor can be a proportional-integral-derivative ("PID") controller. In such instances, the output signal from the processor can be an instruction to increase or decrease the voltage that powers the DC motor. Of course, other types of motors, sensors, and processors may be used to provide a feedback loop to a motor in order to maintain a constant speed of the drive shaft 172. For example, the motor could be a stepper motor, the sensor could be an optical sensor, and the processor could be a predictive feedback controller or other more sophisticated processor.

In some embodiments, the intelligent drive system can include an unjamming function in the event that the auger 180, moving burr 191, or another grinding component becomes jammed during the grinding process, such as by a foreign object or an unusual arrangement of coffee beans getting stuck in the coffee grinder 100. A jam during a grinding process could result from a signal from the sensor 174 that indicates that there is a problem with the rotational speed of the drive shaft 172, such as a rotational speed that is outside of a predefined acceptable range. For example, the intelligent drive system may aim for a constant grind speed of about 1200 RPM, with an actual range in grind speed of about 1100-1600 RPM during the feedback and adjustment process. If the sensor 174 detects an improper rotational speed while full torque is being applied to the motor 170, then the processor 176 can determine that the coffee grinder 100 is jammed. An improper rotational speed could be 0, or could be anything less than 500 RPM, for example. The processor 176 could then respond by sending a different output signal to the motor 170 to reverse the drive rotation of the motor to unjam the coffee grinder 100. The processor 176 could also respond to determining that the grinder is jammed by emitting a beep or other sound to alert the user. For example, an "SOS" pattern of beeping might be a suitable jam alert.

Figure 4A:
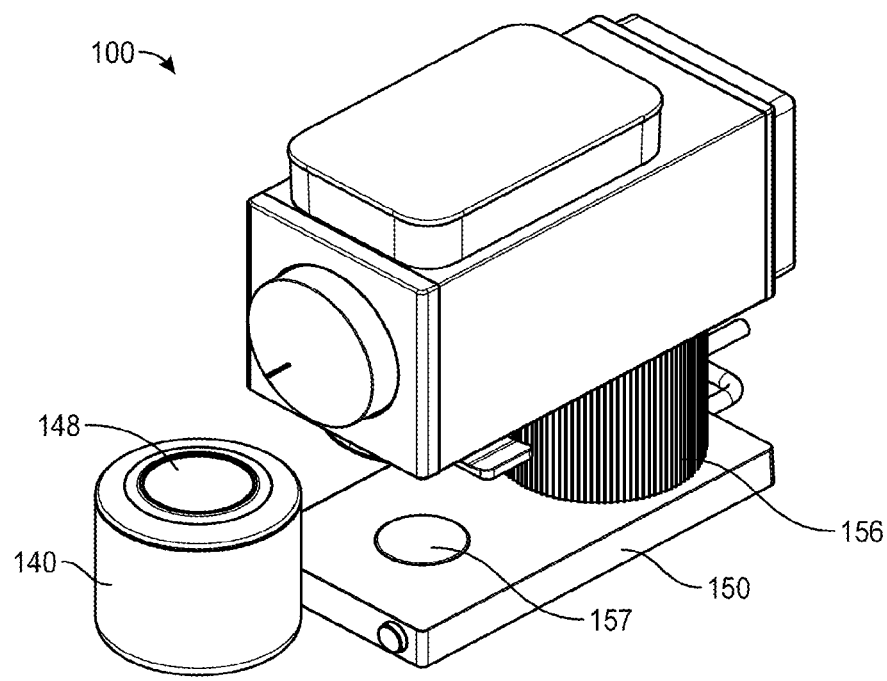
FIG. 4A illustrates in perspective view the example coffee grinder of FIG. 1 with the container removed according to one embodiment of the present disclosure.

Turning next to FIG. 4A, the example coffee grinder of FIG. 1 having its container removed is illustrated in perspective view. Removable container 140, which may also be referred to as a "catch," can be placed atop base 150 such that it is under a dispensing region of coffee grinder 100 during the grinding process. Fresh coffee grounds can then be captured into the catch or removable container 140 through opening 148. A user can then transport the coffee grounds in the catch 140 to another location and pour them out in order to make coffee.

In order to reduce or eliminate waste or mess, it is preferable that removable container 140 be accurately aligned beneath the dispensing region so that all coffee grounds fall into the container. An optimal horizontal alignment results when the removable container is perfectly centered on cover 157 on an upper surface of base 150. Substantially all coffee grounds dispensed from the grinding component are received into the removable container 140 with no spill or mess when the removable container is aligned horizontally at an optimal horizontal alignment with respect to the grinding component.

To facilitate an optimal or accurate alignment, a catch magnetic component can be located proximate the bottom of removable container 140 and a corresponding base magnetic component can be located beneath cover 157. The catch magnetic component and base magnetic component can be arranged such that a magnetic attraction takes place a user places the removable container 140 on top of cover 157. The magnetic components then interact to move or slightly adjust the removable container horizontally across the base and align it accurately beneath the dispensing region. In some embodiments, the resulting horizontal alignment of the removable component can be within about 1.5 mm of an optimal horizontal alignment for the removable component.

Figure 4B:
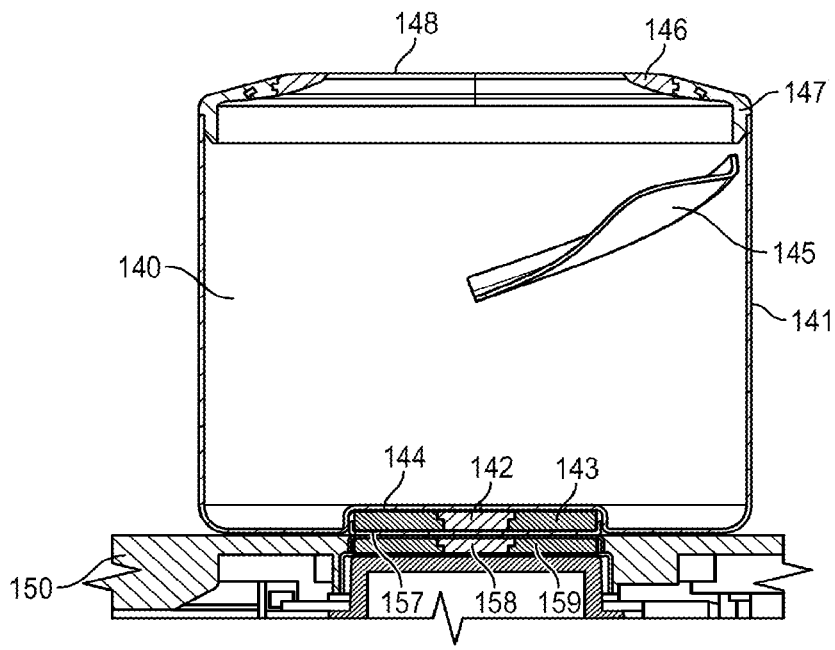
FIG. 4B illustrates in side cross-sectional view an example removable container on a base of a coffee grinder according to one embodiment of the present disclosure.

FIG. 4B illustrates in side cross-sectional view the removable container 140 when it is accurately aligned on the base of 150 the coffee grinder. Base 150 can include a base magnet 158 within a base magnet holder 159, with both of these items located just beneath cover 157. Removable container 140 can include one or more sides 141 and a catch magnet 142 within a catch magnet holder 143, with both of these items embedded within the bottom of the removable container beneath a rise 144 in the bottom. Removable container 140 can also include one or more wings 145 and a removable cover 146 with a cover overholding 147. It will be readily appreciated that catch magnet 142 and base magnet 158 can be any magnetic components arranged to have a magnetic attraction force between them. In some instances, only one of these components needs to be a magnet, while the other may simply be a metallic item. In some instances, both of these components can be magnets, and the magnets can be arranged such that opposite poles for each magnet are facing each other in the position shown.

Figure 5A:
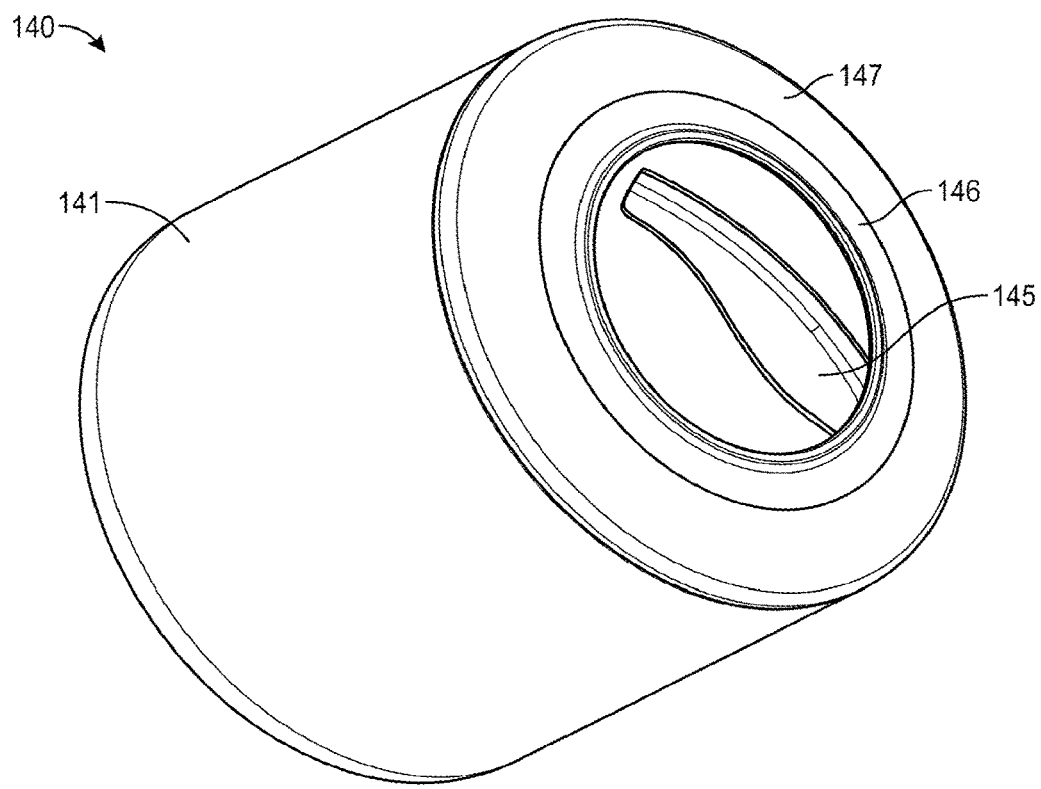
FIG. 5A illustrates in rotated perspective view an example removable container for a coffee grinder according to one embodiment of the present disclosure.
Figure 5B:
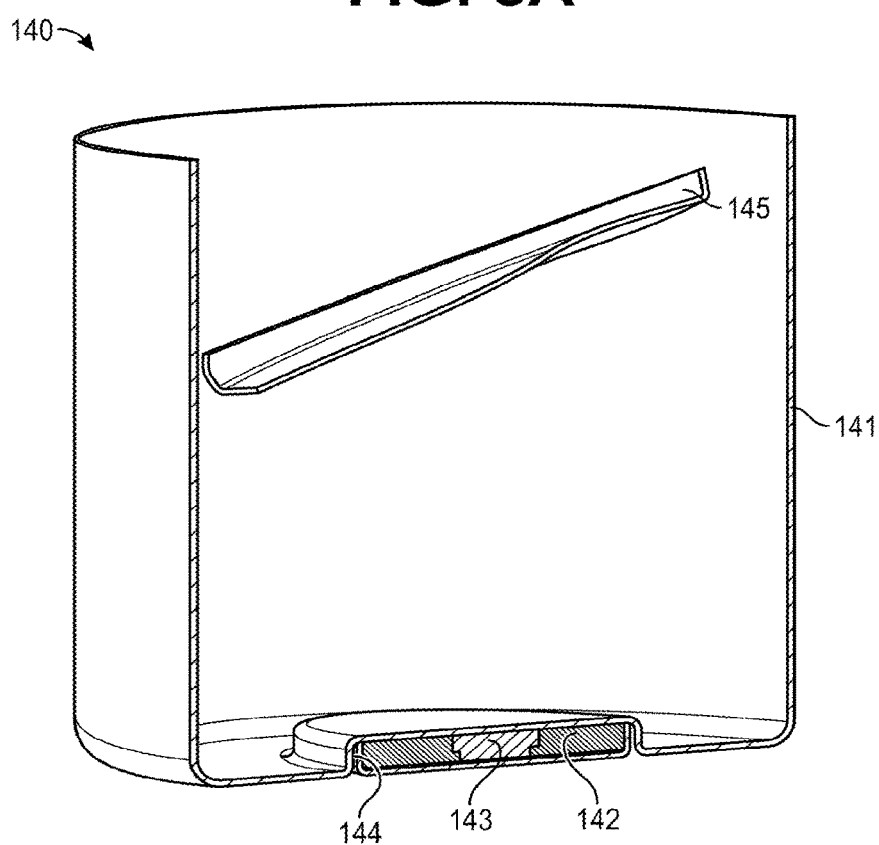
FIG. 5B illustrates in side perspective cross-sectional view the example removable container of FIG. 5A according to one embodiment of the present disclosure.
Figure 6A:
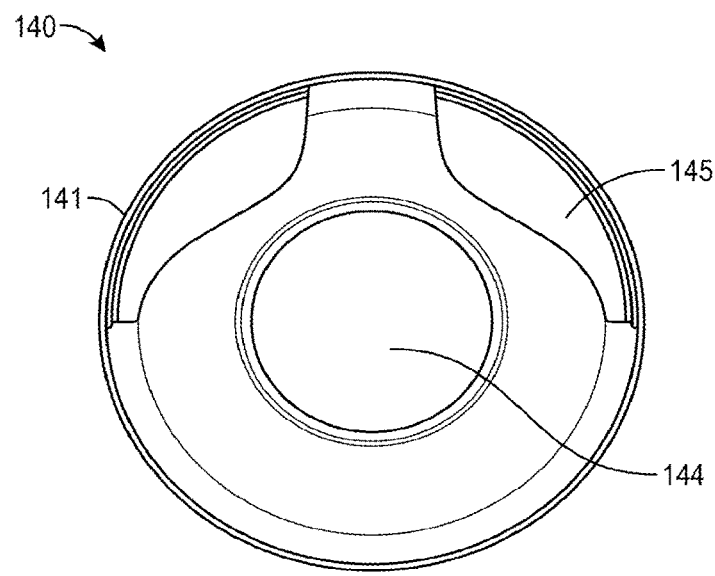
FIG. 6A illustrates in top plan view the example removable container of FIG. 5A with its cover removed according to one embodiment of the present disclosure.
Figure 6B:
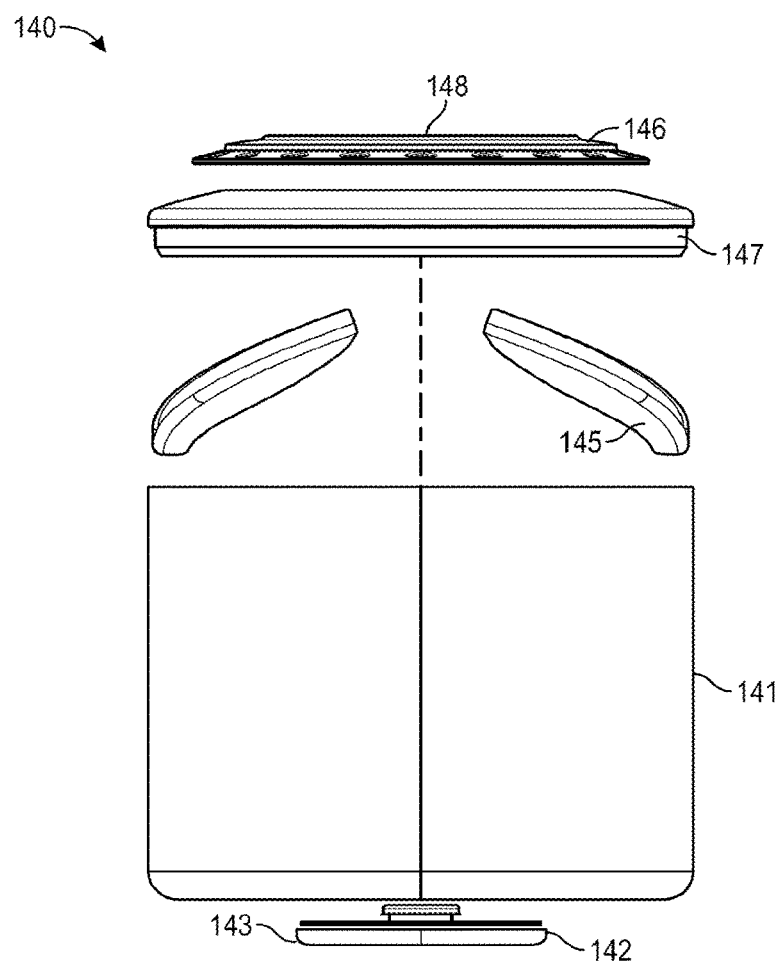
FIG. 6B illustrates in side exploded view the example removable container of FIG. 5A according to one embodiment of the present disclosure.

Continuing with FIG. 5A, an example removable container for a coffee grinder is shown in rotated perspective view. For purposes of illustration, removable container 140 is also shown in side perspective cross-sectional view in FIG. 5B, in top plan view with its cover removed in FIG. 6A, and in side exploded view in FIG. 6B. In addition to the catch magnet 142 facilitating an accurate container alignment during grinding, catch wings 145 can also reduce or eliminate waste or mess. Catch wings 145 can be curved flanges that help to funnel coffee grounds as they are poured out of the removable container 140. Each of catch wings 145 can be fastened to an inner side 141 of removable container 140, such as by welds, glue, rivets, or other type of attachment. In some arrangements, the walls or sides 141 and catch wings 145 can both be formed of aluminum, stainless steel, or some other metal, such that spot welding can be used to fasten the catch wings to the sides. Each of catch wings 145 may define an involute curve, such that they can be readily attached to an inner cylindrical wall 141 of removable container 140 while also promoting an efficient pour of coffee grounds from the container. Removable container 145 may also include useful indicators (not shown) rising along its inner sides 141, which indicators can suggest an amount of water to be used in making coffee corresponding to the level of grounds in the container.

In various embodiments, removable container 140 can include a removable cover 146 to facilitate the easy pouring of coffee grounds from the container. This removable cover 146 can have a central opening 148 to allow coffee grounds to be dispensed into the removable container 140, and can be formed from metal or hard plastic, for example. A cover overmolding 147 can be formed from rubber or another suitable flexible material that is molded over the removable cover 146. To facilitate this construction, the removable cover 146 can include a number of holes or perforations through which the cover overmolding 147 is formed. The flexible nature of the cover overmolding 147 allows for a ready and snug fit between the removable container 140 and the dispensing region of the coffee grinder 100 when the removable container is accurately aligned horizontally beneath the dispensing region. This ready and snug fit resulting from the flexible cover overmolding 147 occurs even where various relevant parts vary in size, which size variances can occur due to tolerance ranges and stack up during a mass manufacturing process. The flexible nature of cover overholding 147 thus facilitates a proper vertical alignment of removable container 140 with respect to the dispensing region.

Figure 7A:
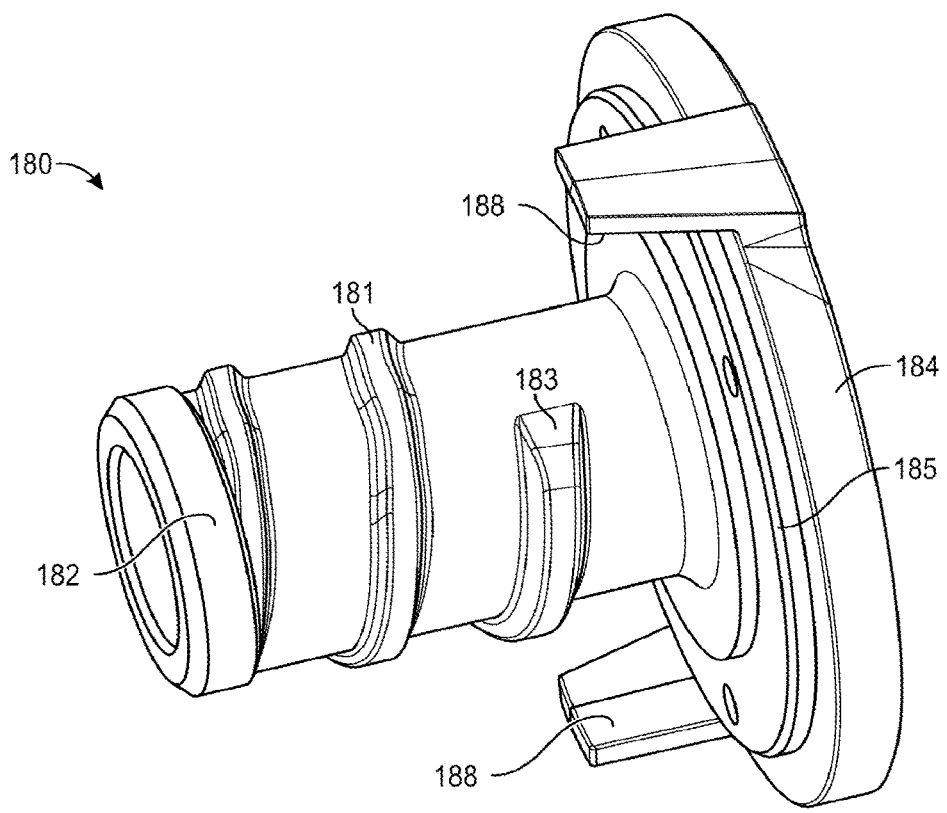
FIG. 7A illustrates in side perspective view an example drive system auger for a coffee grinder according to one embodiment of the present disclosure.

Moving now to FIG. 7A, an example drive system auger for a coffee grinder is shown in side perspective view. Auger 180 can include an outer thread 181 having a lead-in portion that gradually rolls into and ends at auger shoulder 182 at a narrow end of the auger and a tapered lead-out portion 183 of the outer thread toward an outer disk portion 184 that is integrally formed at the opposite end of the auger. Outer thread 181 serves to guide or force coffee beans from the narrow end of the auger 180 toward the outer disk portion 184 when the auger rotates during the grinding process. As the guided coffee beans approach the outer disk portion 184 of the auger 180, they reach the burrs inside the grinds chamber where they are then ground. While the pitch of outer thread 181 is constant as shown in FIG. 7A, it is also contemplated that a variable pitch thread or multiple threads could be used.

Auger 180 can also rotationally drive one or more other grinding components, such as a moving burr coupled to the auger. A coupling plate 185 located at an inner surface of the outer disk portion 184 of auger 180 can facilitate attachment of a moving burr to the auger, such that the moving burr is driven by and travels with the auger as the auger rotates. The moving burr can rotate with respect to a facing stationary burr during a typical grinding process. Auger wings 188 extend from opposite sides of outer disk portion 184, and these auger wings can serve to create air flow and help sweep coffee grinds and residue out of the grinds chamber, as explained in greater detail below.

Figure 7B:
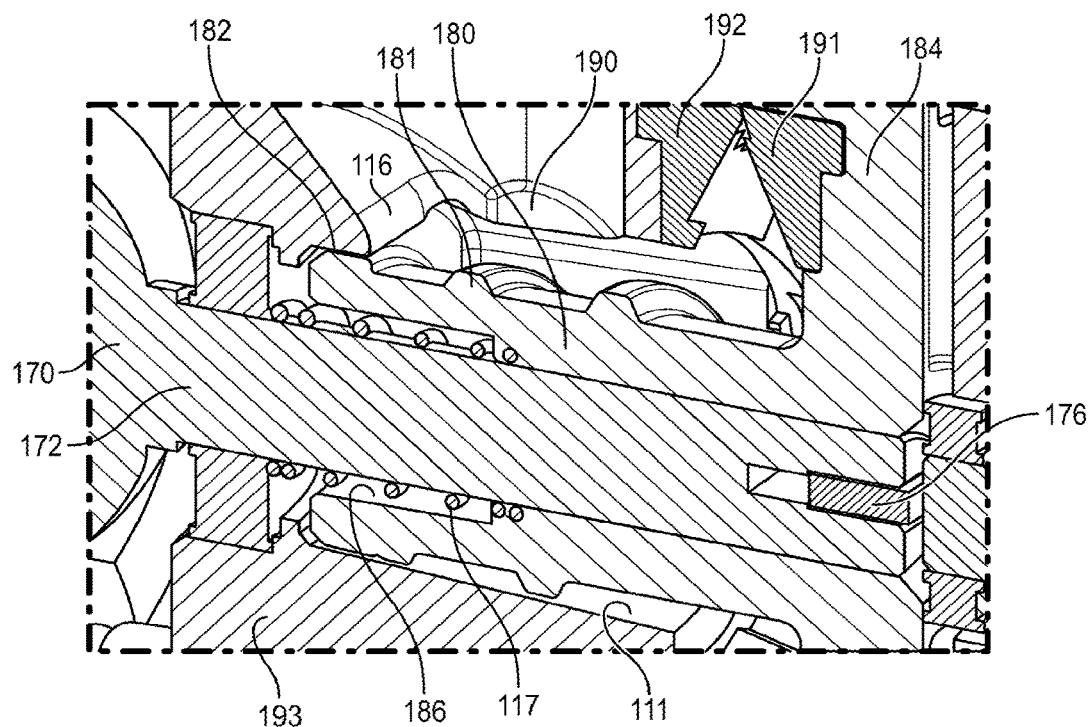
FIG. 7B illustrates in side perspective cross-sectional view the example auger of FIG. 7A within a grinds chamber housing according to one embodiment of the present disclosure.

Some of these auger functions can be seen in FIG. 7B, which illustrates auger 180 within a grinds chamber housing in side perspective cross-sectional view. As shown, auger 180 can have a hollow cylindrical center through which drive shaft 172 extends. Rotational motor 170 drives the elongated drive shaft 172 extending therefrom, which in turn rotationally drives the auger 180 such that outer thread 181 guides coffee beans through the grinds chamber 190 from protective shoulder 116 toward outer disk portion 184 and into the burrs 191, 192. Protective shoulder 116 can be integrally formed as part of an internal housing, such as grinds chamber housing 193 or any other suitable internal component. Protective shoulder 116 can cover the lead-in portion of outer thread 181 and auger shoulder 182, such that the slope or irregular nature of the lead-in thread portion does not contact and jostle coffee beans during high speed auger rotation, such as that which takes place during a typical grinding process. Grinds chamber housing 193 can also include a downward sloping region 111 beneath auger 180, such that coffee beans and particles are more easily pushed toward burrs 191, 192 through grinds chamber 190 due to gravity. Accordingly, the height of outer thread 181 can increase in order to maintain a constant close spacing between auger 180) and grinds chamber housing 193 at the downward sloping region 111. In the event that the pitch of outer thread 181 is constant, this causes an increase in the pitch to height ratio of the outer thread from the narrow end of the auger 180 toward its outer disk portion 184. The result of downward sloping region 111 and its close spacing from outer thread 181 is a lower retention of coffee ground particles and residue after grinding, which results in eliminated or reduced waste as well as greater purity from one grind batch to another.

Shear plate 176 located in a slot at a distal end of drive shaft 172 helps to transfer rotational force or torque in a balanced manner from the drive shaft to the outer disk portion 184 of auger 180, which in turn can be mounted to and drive moving burr 191, such as by way of the coupling plate 185 noted above. Moving burr 191 then rotates at high speed while stationary burr 192 does not move during the grinding process. Shear plate 176 can be configured to break when excess force is being transferred to the auger 180, such as in the case of a sudden jam. In this manner, a relatively inexpensive and easy to replace broken shear plate 176 can be replaced rather than have catastrophic damage occur to the more expensive and more difficult to replace auger 180, motor 170, or another internal component.

The fit between drive shaft 172 and auger 180 can be snug along most of the hollow cylindrical center of the auger, so as to reduce any amount of angular misalignment that may occur between the burrs. While this fit is snug for most of the auger 180, a widened internal cavity 186 at the narrow end of the auger can facilitate the presence of a biasing spring 117. This spring 117 can serve to push the auger 180 such that it slides along the drive shaft 172 into the proper position when the grinds knob is adjusted for a particular setting. Adjusting the position of the auger 180 in this manner then results in a greater or lesser spacing between the grinding burrs 191, 192 during a grinding process, which results in a large or small size of grounds.

Figure 8A:
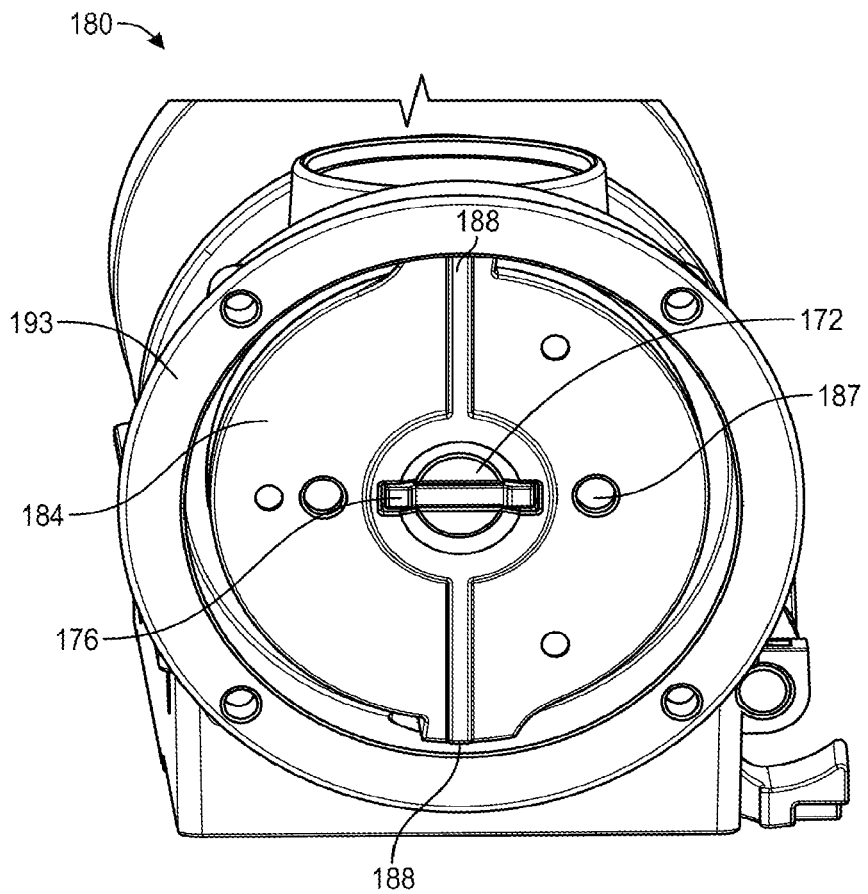
FIG. 8A illustrates in front elevation view the example auger of FIG. 7A within a grinds chamber housing according to one embodiment of the present disclosure.

FIG. 8A illustrates auger 180 within grinds chamber housing 193 in front elevation view. As shown in FIG. 8A, drive shaft 172 rotates counter-clockwise while in forward drive, which transfers force to outer disk portion 184 of the auger by way of shear plate 176. Indents 187 located in the face of outer disk portion 184 can be used to facilitate the disassembly and removal of auger 180. Outer disk portion 184 can have a non-uniform circumference, such as where auger wings 188 extend at opposite sides of the outer disk. In various embodiments, a rubber insulator or other damper (not shown) can be placed across the outer face of disk portion 184, such that sound can be dampened for a quieter grinding process.

Figure 8B:
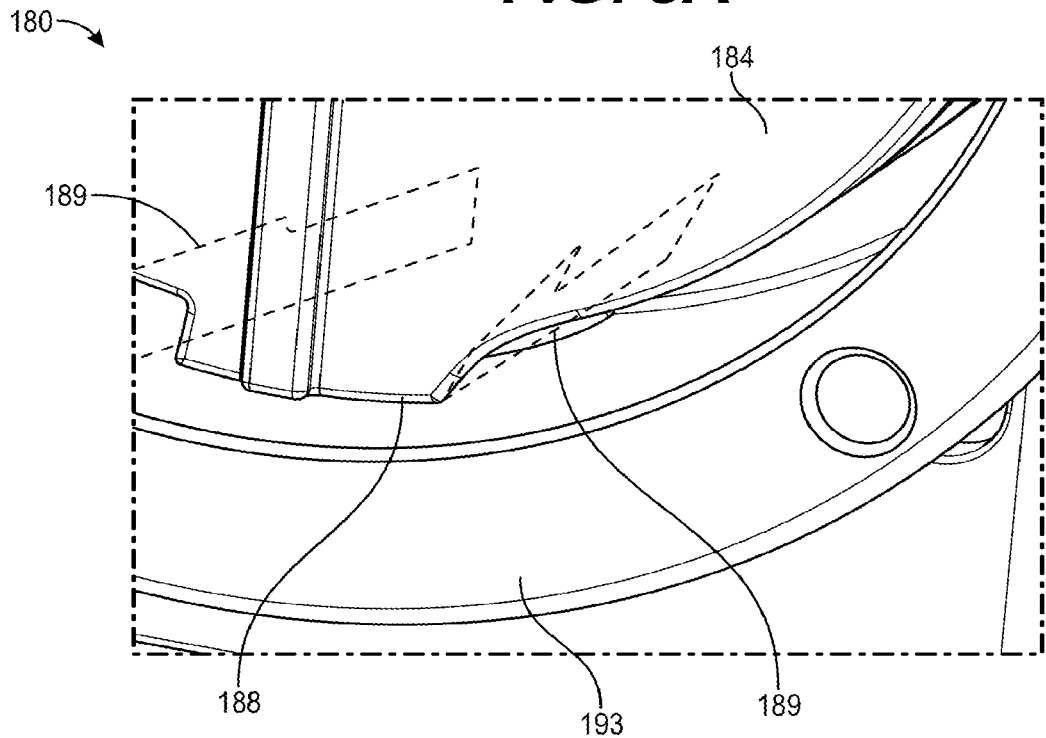
FIG. 8B illustrates in close up side perspective view a wing portion of the example auger of FIG. 7A according to one embodiment of the present disclosure.

FIG. 8B illustrates in close up side perspective view a wing portion of auger 180. As noted above, two auger wings 188 extend from opposite sides of outer disk portion 184. These auger wings 188 generate air flow as they move closely past the edge of grinds chamber housing 193, which then blows coffee grounds out of the grinds chamber, such as to a dispensing spout located beneath the auger. Auger wings 188 can define curved and sloping surfaces 189 at their leading and trailing sides, such that air flow generated by the auger 180 is less turbulent in front of the auger wings 188 due to the shape of these surfaces 189 as the auger spins or rotates in either direction. This then results in less scatter and mess from the coffee grounds being passed through the coffee grinder. In various embodiments, a thin extender (not shown) made from plastic or another suitable flexible material can extend from the auger wings 188 to physically sweep the inner surface of grinds chamber housing 193 for even lower grounds and residue retention.

Figure 9A:
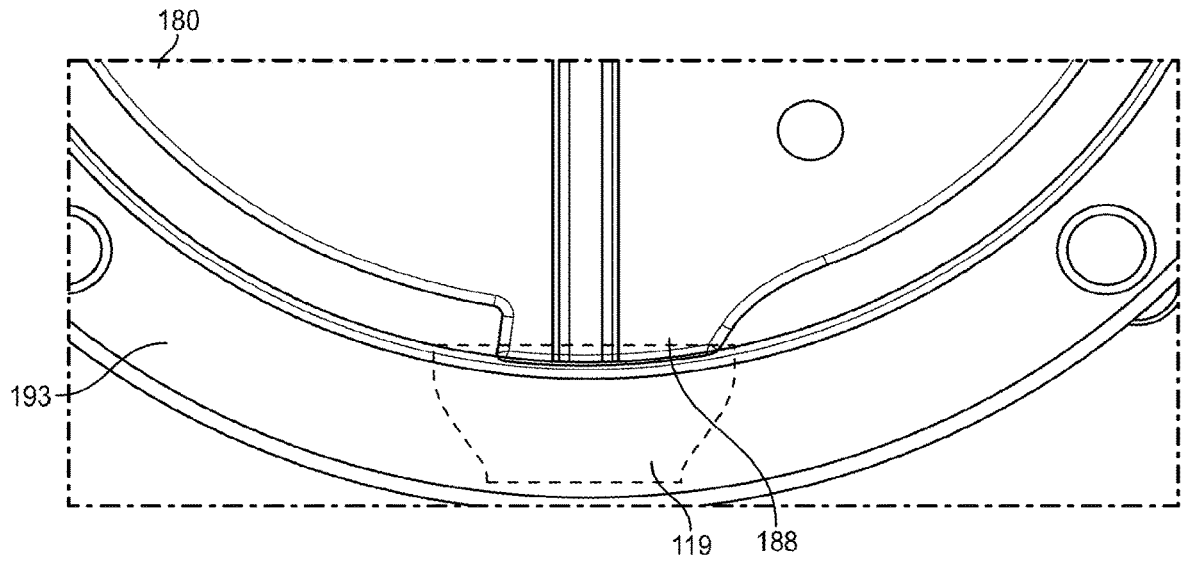
FIG. 9A illustrates in front elevation view a dispensing spout for a coffee grinder according to one embodiment of the present disclosure.
Figure 9B:
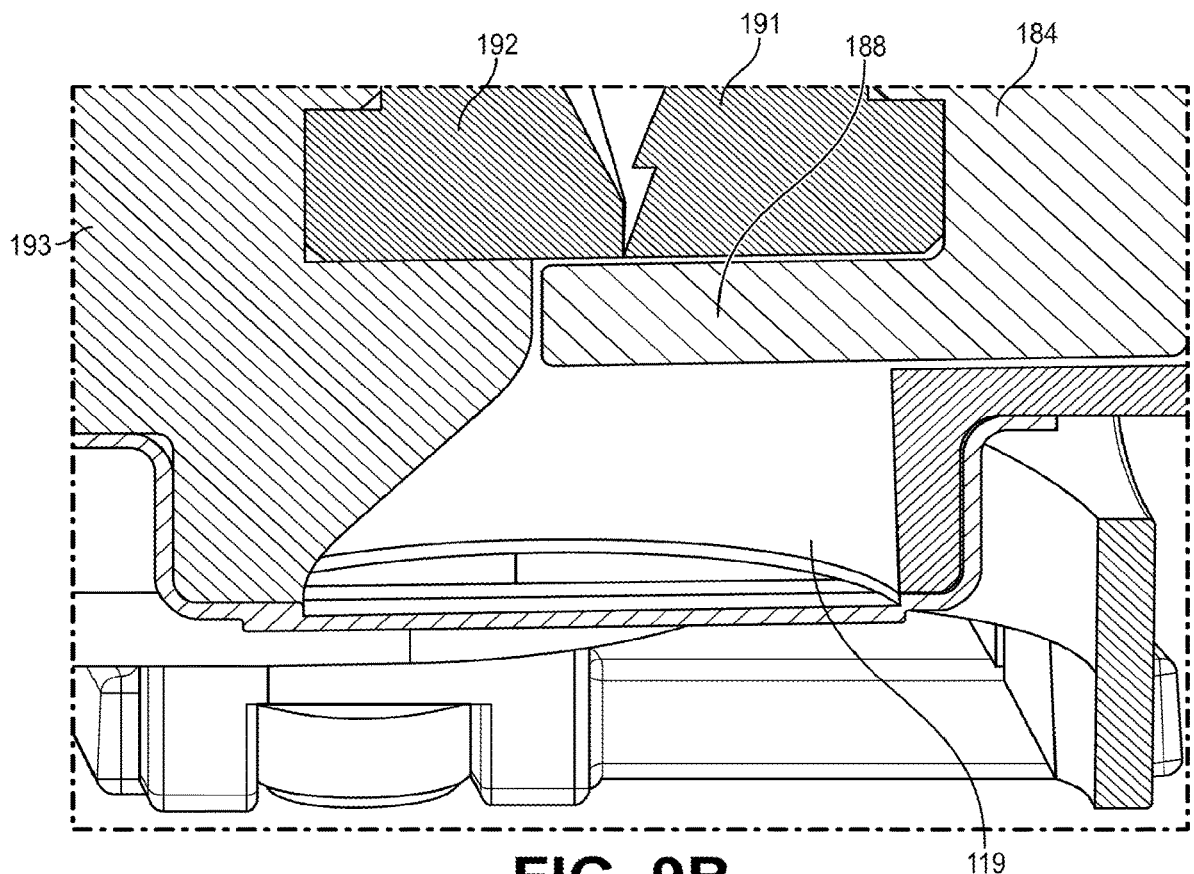
FIG. 9B illustrates in side cross-sectional view the dispensing spout of FIG. 9A according to one embodiment of the present disclosure.

Continuing with FIGS. 9A and 9B a dispensing spout for a coffee grinder is illustrated in front elevation and side cross-sectional views respectively. Dispensing spout 119 can be located beneath various grinding components, such as auger 180 and burrs 191 and 192, and can be located above the removable container when the container is properly aligned. In particular, dispensing spout 119 can have a size and shape that facilitates a smooth or even laminar air flow between from the grinding components and the removable container when coffee grounds are dispensed from the grinding component into the removable container. As shown, an upper region of dispensing spout can curve and slope gradually away from the grinding components. In various embodiments, dispensing spout 119 can be integrally formed within grinds chamber housing 193 or another suitable internal housing component.

Figure 10A:
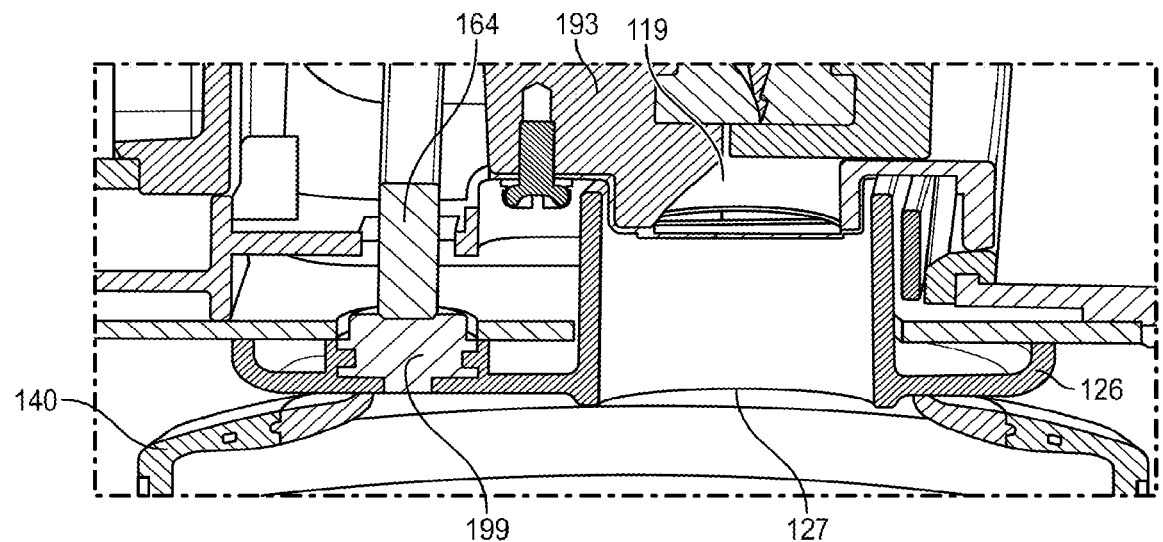
FIG. 10A illustrates in side cross-sectional view an example chute assembly for a coffee grinder according to one embodiment of the present disclosure.

After passing through dispensing spout 119, coffee grounds can then pass through a chute assembly just before they enter the removable container. FIG. 10A illustrates in side cross-sectional view an example chute assembly for a coffee grinder. Chute assembly 126 can be located directly beneath dispensing spout 119 and grinds chamber housing 193 and can be located directly above removable container 140 when the container is properly aligned within the coffee grinder. Rather than being integrally formed within another component, chute assembly 126 can be a separate part that attaches to an underside of the coffee grinder housing. Chute assembly 126 can be formed from a flexible rubber or plastic material, such that an easy and tight mating with the flexible cover of the removable container 140) can be obtained whenever the container is properly aligned horizontally. The flexible nature of chute assembly 126 can also combine with the flexible nature of the cover of removable container 140 to help facilitate a proper vertical alignment of the removable container with respect to the dispensing region of the coffee grinder, as noted above. Chute assembly 126 can include a central opening 127 that facilitates the passage of coffee grounds from the dispensing spout 119 into the removable container 140. As in the case of the dispensing spout 119, central opening 127 can be of a size and shape that promotes smooth or even laminar air flow to allow the smooth passage of coffee grounds. Again, such smooth or laminar air flow can serve to reduce or eliminate messes or wasted coffee grinds. Chute assembly interactions with hammer component 164 and metal plug 199 are detailed with the knocker system below.

Figure 10B:
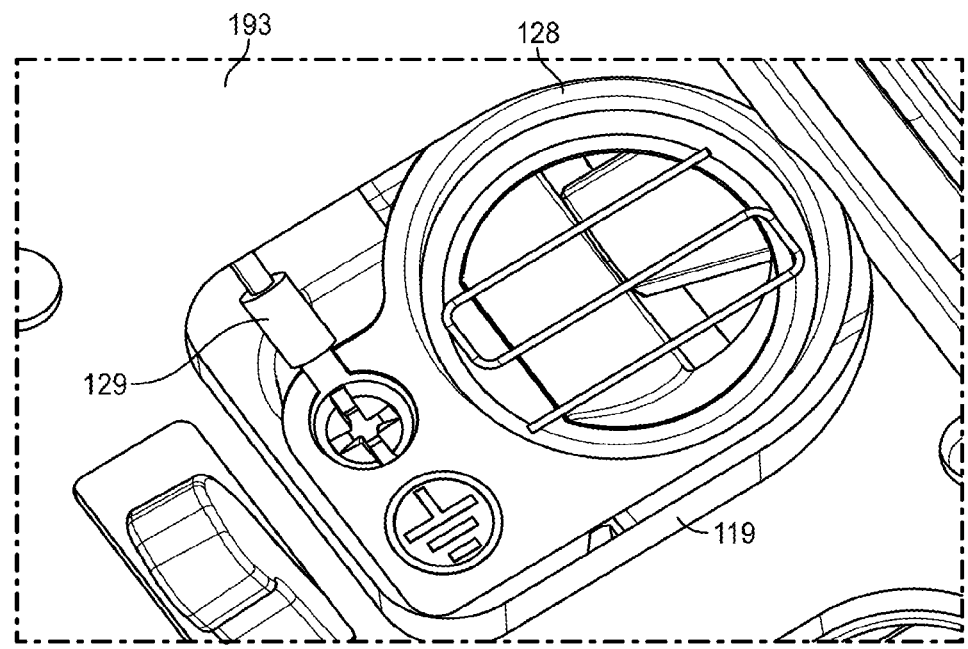
FIG. 10B illustrates in bottom plan view an anti-static safety guard for the dispensing spout of a coffee grinder according to one embodiment of the present disclosure.

FIG. 10B illustrates in bottom plan view an anti-static safety guard for the dispensing spout of a coffee grinder. Safety guard 128 can be located between the grinding components and the removable container, and more particularly between the dispensing spout and the chute assembly. In various embodiments, safety guard 128 can be fastened directly at the lower mouth of the dispensing spout and can be formed from metal or another electrically conductive material. Safety guard 128 can be configured to allow the passage of coffee grounds from the grinding components into the removable container while preventing the insertion of larger objects, such as a finger, into the grinding components from the opposite direction. Safety guard 128 can also function to break up clumps of coffee grounds as they are exiting the dispensing spout 119. An electrical ground 129 can provide an anti-static charge release to the safety guard, such that small coffee grounds or residue that are statically charged and clinging to the safety guard 128 can be discharged and released.

Figure 11A:
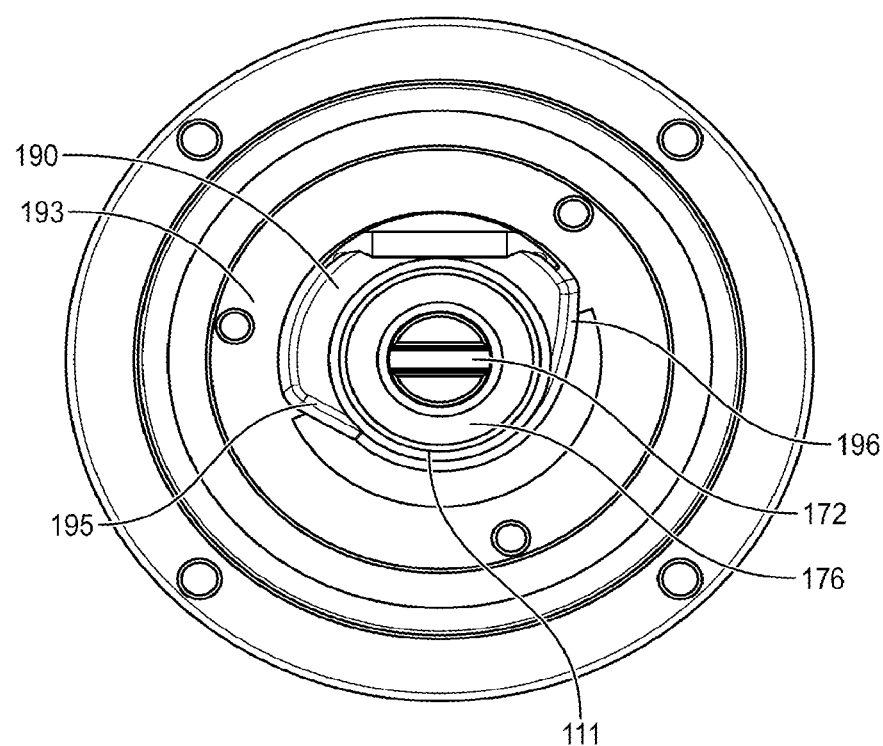
FIG. 11A illustrates in front elevation view an example grinds chamber for a coffee grinder according to one embodiment of the present disclosure.

Transitioning to FIG. 11A, an example grinds chamber for a coffee grinder is illustrated in front elevation view. Grinds chamber 190 is a central cavity that is defined by a grinds chamber housing 193 and is where the coffee beans and partially ground and kicked back or recycled bean grinds are pushed through by the auger and fed into the grinding burrs. Due to the counter-clockwise rotational motion of the auger, as shown in FIG. 11A, most of the coffee beans and grinds are fed into the grinding burrs at the left "intake" side of the grinds chamber 190 and tend to exit the grinding burrs at the right "exit" side of the grinds chamber. As shown in FIG. 11A, grinds chamber 190 generally defines a cross-sectional geometry that is asymmetrical in nature. Rather than have a symmetrical chamber, as is common in many blade and burr coffee grinders, grinds chamber 190 has a gradual downward slope 195 on the intake side of the grinding region and a sharply rising slope 196 on the exit side of the grinding region. This asymmetrical profile results in a more even grind, as coffee beans are gradually fed into the grinding burrs from the side having gradual downward slope 195, and partially ground coffee grinds that exit the other side and are recycled back into grinds chamber 190 fall down the sharply rising slope 196 toward downward sloping region 111 at the bottom of the grinds chamber. These recycled grinds are then pushed back into the grinding region faster via the auger thread and downward sloping region interaction noted above, rather than spin around the chamber wildly. This asymmetrical cross-sectional profile for grinds chamber 190 thus results in a lower retention of coffee ground particles and residue after grinding, with resulting benefits for such noted elsewhere herein.

Figure 11B:
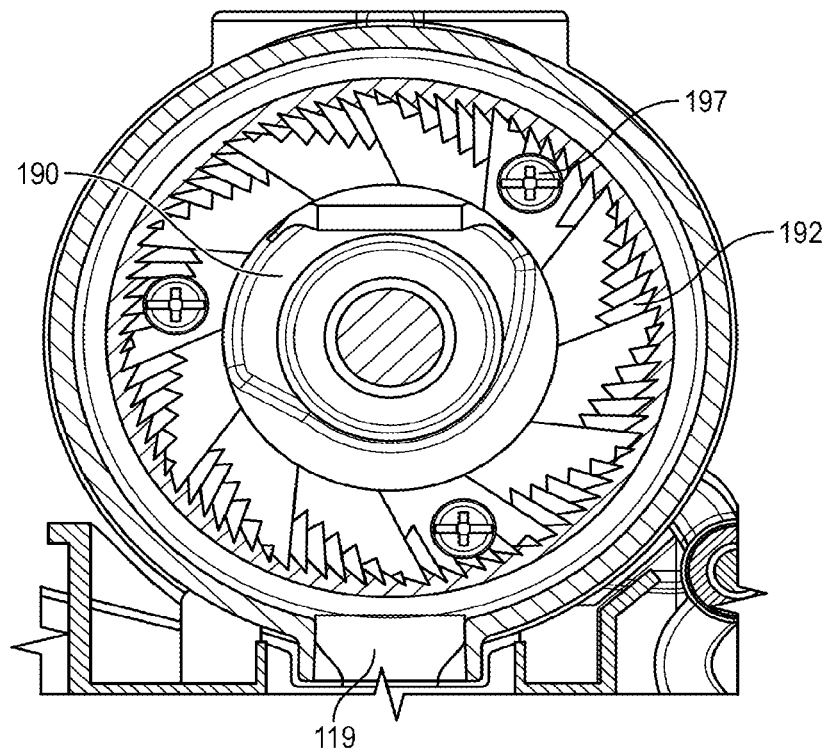
FIG. 11B illustrates in front cross-sectional view the grinds chamber of FIG. 11A with a visible screw distribution for a stationary burr according to one embodiment of the present disclosure.

Continuing with FIG. 11B, the grinds chamber is shown in front cross-sectional view with a visible screw distribution for a stationary burr. FIG. 11B depicts grinds chamber 190 with moving burr 191 removed, such that only stationary burr 192 remains. Stationary burr 192 can be a standard three screw hole burr that is fastened in place against the grinds chamber housing with three screws 197, although other suitable fasteners may also be used. As shown, screws 197 are arranged in an asymmetrical pattern with respect to a vertical axis of the coffee grinder, rather than a symmetrical pattern that is common for most burr type coffee grinders. The asymmetrical screw pattern allows for the use of commonly available burrs, while resulting in improved grinding at the region above the intake side grinding region 194 and the dispensing spout 119, which is the most used grinding region of the burr in a typical grinding process. By not including a screw in this region, as shown, a constant and uninterrupted grind path is available between the screws located at either end of this most used region.

Figure 12A:
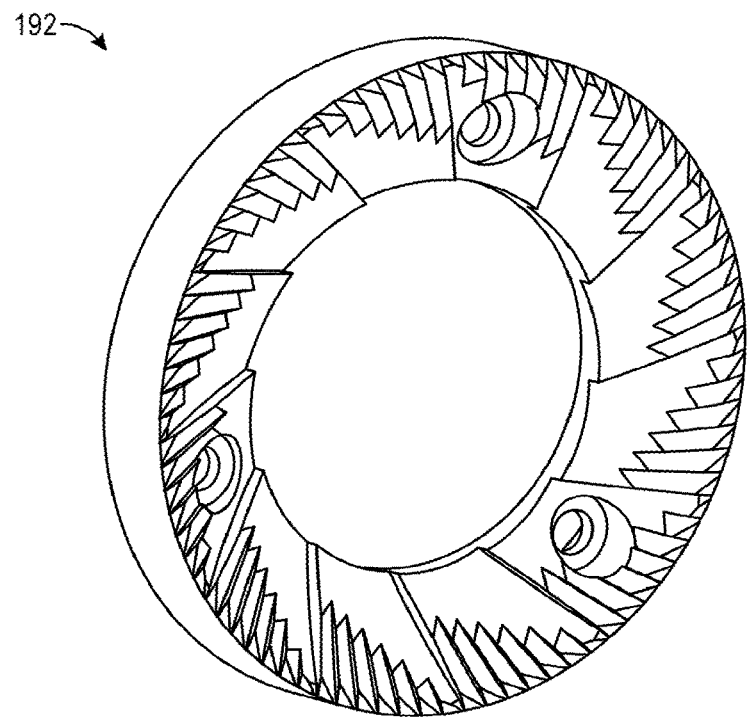
FIG. 12A illustrates in side perspective view the stationary burr of FIG. 11B according to one embodiment of the present disclosure.
Figure 12B:
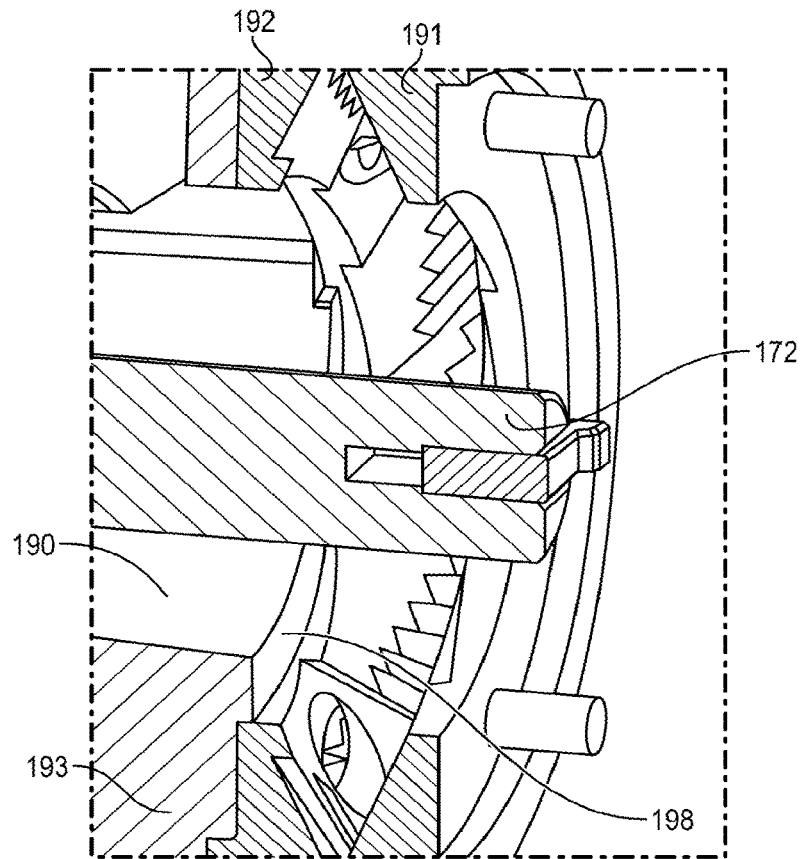
FIG. 12B illustrates in partial cutaway and partial cross-section side perspective view the grinds chamber of FIG. 11A according to one embodiment of the present disclosure.

FIG. 12A depicts stationary burr 192 in side perspective view, while FIG. 12B shows grinds chamber 190 in partial cutaway and partial cross-section side perspective view. Again, stationary burr 192 does not rotate, while moving burr 191 is driven in a counter-clockwise direction by the auger (not shown), which is in turn driven by drive shaft 172. To prevent small coffee grounds and residue buildup, grinds chamber 190 is slightly extended by a slide portion 198 along the side of stationary burr 192. Slide portion 198 covers some of the side of stationary burr 192, which is where grounds and residue can get stuck and left behind. By extending the grinds chamber 190 such that reduced amounts of coffee grounds or residue are left along the side of stationary burr 192, waste is reduced, and a greater purity of coffee grounds is observed in each ground batch.

Figure 13A:
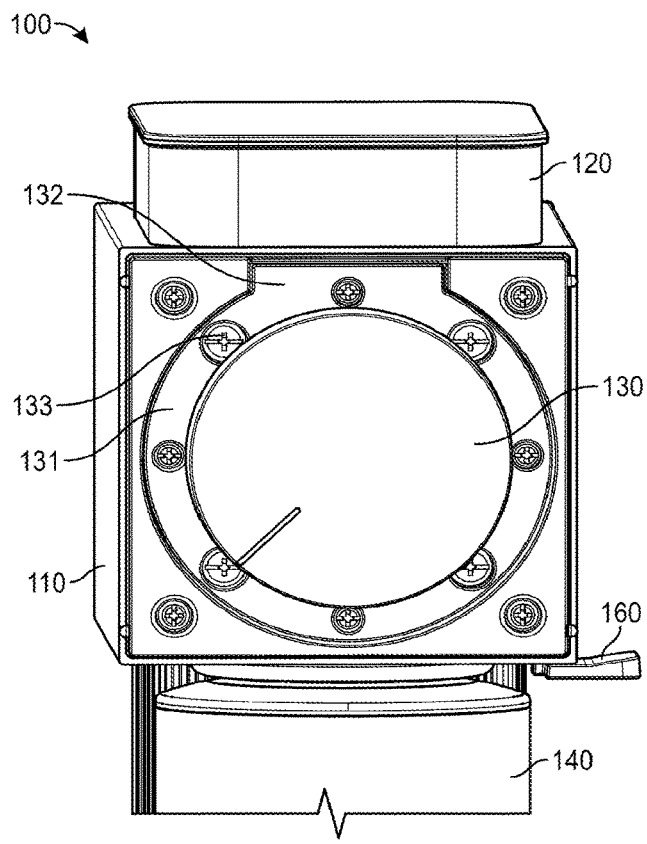
FIG. 13A illustrates in front elevation view a front-end knob assembly for a coffee grinder according to one embodiment of the present disclosure.

Moving next to FIG. 13A, a front-end knob assembly for a coffee grinder is illustrated in front elevation view. Coffee grinder 100 is shown with front housing cap 114 removed to reveal a knob assembly 131 and various screws or fasteners 133 underneath. Grinds knob 130 can allow a user to adjust the grind size of the coffee being ground and as such can have various settings, such as about a dozen different size settings. Grinds knob 130 can be part of knob assembly 131, which can be readily removed from coffee grinder 100, such as for servicing or replacement. Knob assembly 131 can have a "key" 132 or extension shape that matches the shape of a corresponding housing portion of the coffee grinder 100, such that the knob assembly can only be inserted into the coffee grinder in the right orientation.

Figure 13B:
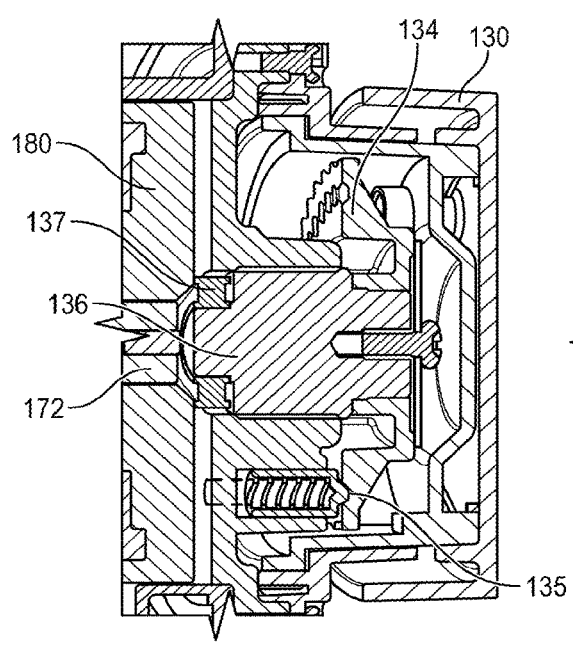
FIG. 13B illustrates in side cross-sectional view the front-end knob assembly of FIG. 13A for according to one embodiment of the present disclosure.

FIG. 13B shows the front-end knob assembly in side cross-sectional view. As grinds knob 130 is rotated, an attached click plate 134 rotates as well, with a spring-loaded pin 135 clicking into various detents in the backside of the click plate as the knob is rotated from one setting to another. Threaded spacer 136 rotates to move forward or backward as the grinds know 130 and click plate 134 are rotationally adjusted, and this spacer in turn pushes a rotational bearing 137 up against or away from auger 180. Auger shifts forward or backward accordingly, which results in an adjusted spacing between the dual grinding burrs.

Figure 13C:
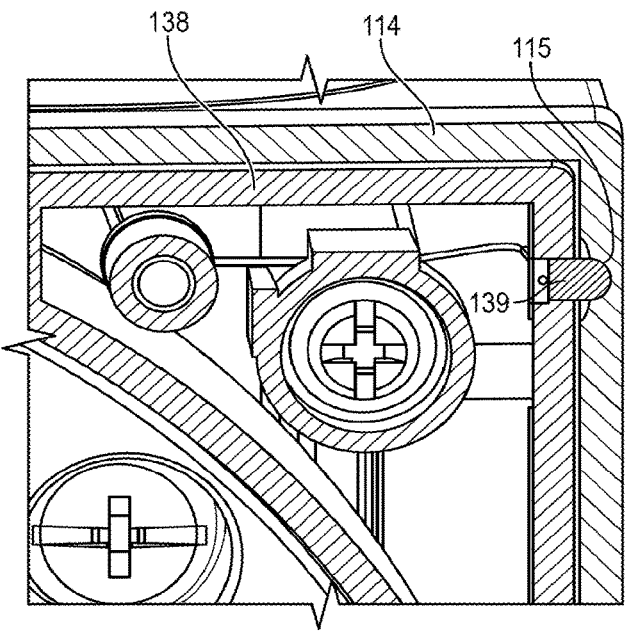
FIG. 13C illustrates in front cross-sectional view a corner of the front-end knob assembly of FIG. 13A according to one embodiment of the present disclosure.

FIG. 13C illustrates in front cross-sectional view a corner of the front-end knob assembly to show how front housing cap 114 can be readily snapped onto or off of the coffee grinder. A detent 115 at an inner portion of the sidewall of front housing cap 114 corresponds to a pin 139 that extends outward from a sidewall of knob assembly housing 138. Multiple such pins 139 can be located about the inner housing 138, with corresponding detents 115 being formed along the inner sidewalls of housing cap 114. In various embodiments, housing cap 114 can provide improved aesthetics to the overall coffee grinder by covering all screws, bolts, and other connectors associated with knob assembly 131.

Figure 14A:
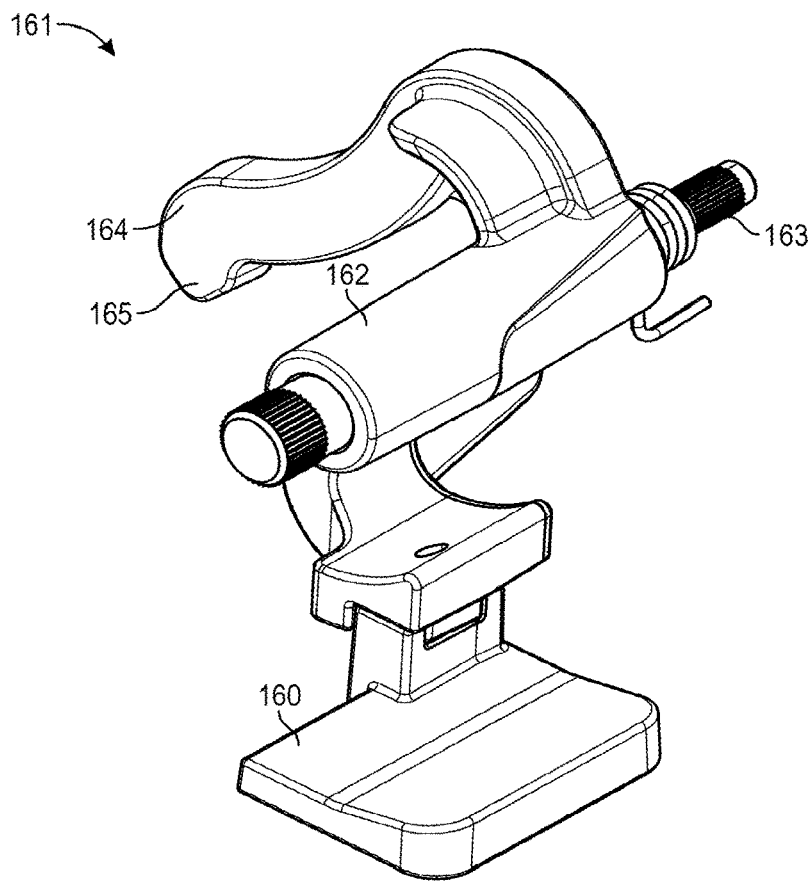
FIG. 14A illustrates in side perspective view an example knocker system for a coffee grinder according to one embodiment of the present disclosure.
Figure 14B:
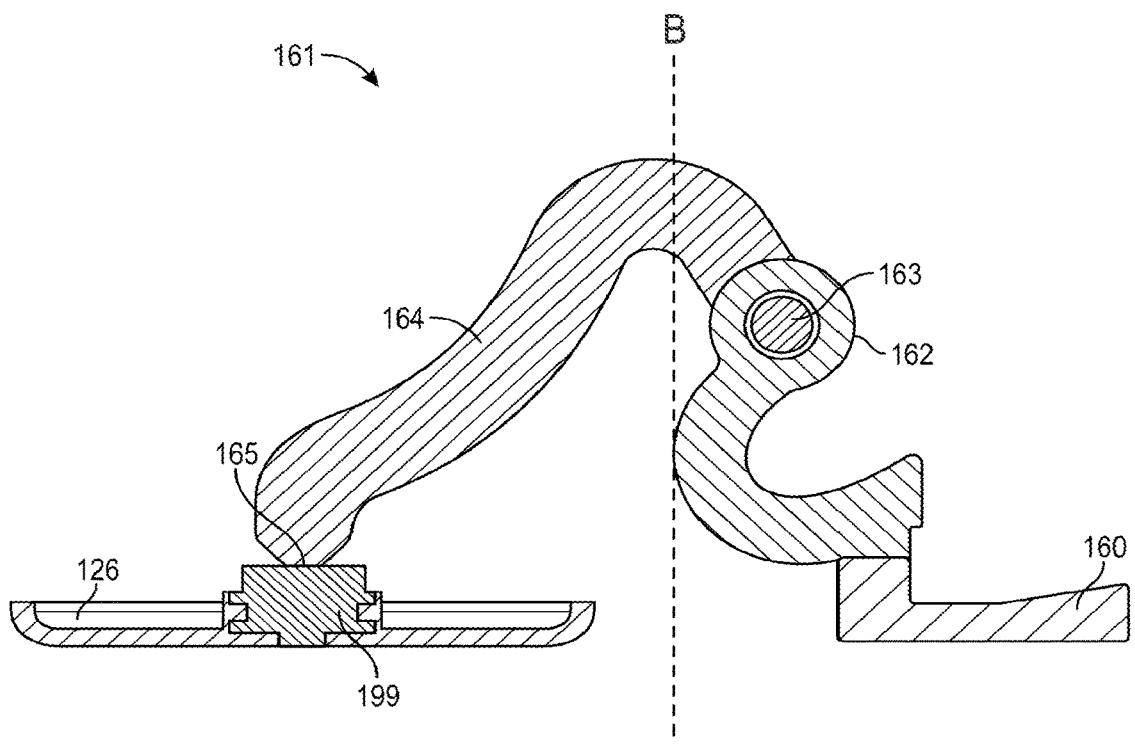
FIG. 14B illustrates in side staggered cross-sectional view the example knocker system of FIG. 14A according to one embodiment of the present disclosure.

Moving next to FIGS. 14A and 14B, an example knocker system for a coffee grinder is illustrated in side perspective and side staggered cross-sectional views respectively. In FIG. 14B, the cross-sectional views are staggered at different locations, which is indicated by stagger line B. Knocker system 161 can be configured to dislodge coffee grounds and residue from a region in the coffee grinder after a batch of coffee has been ground. The coffee grounds and residue can be dislodged into a container beneath the grinding component and can come from a grinding component and/or one or more locations between the grinding component and the container, which can be a removable container. Actuation of the knocker system 161 can involve a user pressing or flicking an input such as lever component 160. As will be readily appreciated, the removal of most or all coffee grounds and residue is desirable after each batch of coffee is ground in order to eliminate or minimize retention, messes, and impurities that carry over from one ground batch to another.

In various embodiments, knocker system 161 can include an elongated arm 162 located proximate a lower region of the grinding component, a hammer component 164 coupled to a first distal end of the elongated arm, a spring component 163 coupled to a coffee grinder housing and to the elongated arm, and a lever component 160 coupled to a second distal end of the elongated arm. The spring component 163 can include a torsion spring within a hollow region of the elongated arm 162 which provides a biasing force to the elongated arm 162 that forces a hammer surface 165 of the hammer component 164 against some part of the coffee grinder located proximate a lower region of the grinding component. In some arrangements, the part of the coffee grinder struck by the hammer component 164 can be the chute assembly 126 described above. The chute assembly 126 can include a metal plug 199 that is struck by the hammer component 164, resulting in a satisfying metallic ping, with the rest of the chute assembly being a hard plastic that is overmolded around the metal plug 199. The chute assembly 126 can be attached to the coffee grinder housing in locations that are away from metal plug 199, such that a springboard effect in the chute assembly increases the effectiveness of the knocker system 161. Striking the chute assembly 126 can be useful in situations where static buildup might cause coffee grounds and residue to cling to the inner walls of the central opening of the chute assembly.

The lever component 160, which can be a lever, button, tab, or the like, can be configured to receive an actuation force that overcomes the biasing force of the spring component 163 in order to rotate the elongated arm 162 such that the hammer surface 165 of hammer component 164 moves away from the chute assembly 126 or other coffee grinder part to be struck. A release of the actuation force then results in the biasing force causing the elongated arm 162 to rotate quickly back to its original position such that hammer surface 165 of the hammer component 164 strikes the chute assembly 126 or other coffee grinder component to dislodge the ground coffee residue.

Figure 15:
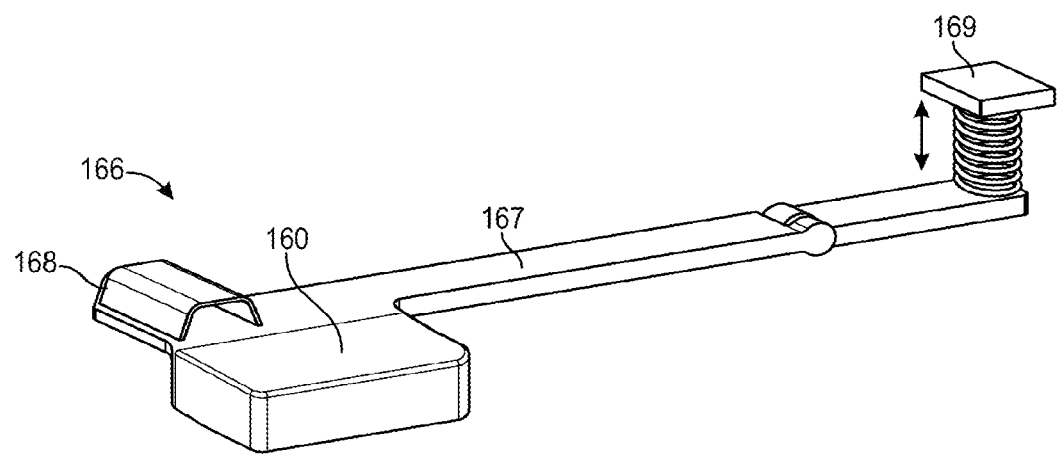
FIG. 15 illustrates in side perspective view an alternative example knocker system for a coffee grinder according to one embodiment of the present disclosure.

Lastly, FIG. 15 illustrates in side perspective view an alternative example knocker system for a coffee grinder according to one embodiment of the present disclosure. Alternative knocker system 166 can be similar to knocker system 161 above in that coffee grounds and residue are dislodged from within the coffee grinder due to a knocking effect. Knocker system can include lever component 160, an alternative elongated arm 167, an alternative spring component 168, and an alternative hammer component 169. Alternative spring component 168 can include a compression spring rather than a torsion spring. Various adjustments can be made to the arrangement of alternative knocker system 166 to result in a similar knocking effect of the hammer component 164 against some portion of the coffee grinder when the knocker system 165 is actuated. For example, alternative knocker system 166 can be configured such that alternative elongated arm 167 pivots rather than rotates when an actuation force is applied to lever component 160.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. An apparatus, comprising: a housing configured to receive coffee beans; a grinding component located within the housing and configured to grind the coffee beans received in the housing into coffee grounds; a removable container located beneath the grinding component and configured to receive the coffee grounds dispensed from the grinding component, wherein the removable container includes one or more sides, a bottom, and a first magnetic component, and wherein the first magnetic component is embedded within the removable container beneath a bottom outer surface of the removable container that is substantially flat in all directions; and a base located beneath the grinding component and configured to support the removable container at an upper surface thereof, wherein the base includes a second magnetic component that is configured to interact with the first magnetic component to align automatically the removable container with respect to a dispensing region when the removable container is placed atop the base, wherein the upper surface of the base is substantially flat in all directions, wherein the second magnetic component is embedded within the base beneath its substantially flat upper surface, and wherein the removable container and the base define geometries that facilitate the ability of the removable container to slide across the flat upper surface of the base horizontally in all directions.

2. The apparatus of claim 1, wherein the first magnetic component is located proximate the bottom of the removable container and is embedded within the removable container.

3. The apparatus of claim 1, wherein the second magnetic component interacts with the first magnetic component to align the removable container in a horizontal direction with respect to the dispensing region.

4. The apparatus of claim 3, wherein a resulting horizontal alignment of the removable container is within 1.5 mm of an optimal horizontal alignment for the removable container.

5. The apparatus of claim 4, wherein the removable container includes a flexible cover that facilitates a proper vertical alignment of the removable container with respect to the dispensing region.

6. The apparatus of claim 1, wherein the removable container includes one or more curved flanges located within and along the one or more sides of the removable container, the one or more curved flanges being configured to funnel the coffee grounds that are poured out of the removable container.

7. The apparatus of claim 1, further comprising: a dispensing spout forming part of the dispensing region and located within the housing, beneath the grinding component, and above the removable container, wherein the dispensing spout has a shape that facilitates air flow between the grinding component and the removable container when the coffee grounds are dispensed from the dispensing region into the removable container.

8. The apparatus of claim 1, wherein interaction between the first magnetic component and the second magnetic component results in automatic alignment of the removable container by the removable container automatically sliding across the flat upper surface of the base until the first magnetic component and the second magnetic component are aligned with each other.

9. The apparatus of claim 1, wherein the first magnetic component is located within a first magnetic component holder that is also embedded within the removable container beneath the substantially flat bottom outer surface of the removable container.

10. The apparatus of claim 9, wherein the second magnetic component is located within a second magnetic component holder, and wherein the second magnetic component and the second magnetic component holder are both embedded within the base beneath an upper surface of the base that is substantially flat in all directions.

11. The apparatus of claim 1, wherein the base defines a substantially flat component that is vertically spaced apart from the housing and the grinding component.

12. The apparatus of claim 1, further comprising: a support column located atop and coupled to the base, wherein the support column is located beneath and supports the housing and the grinding component.

13. The apparatus of claim 1, further comprising: a knocker system configured to dislodge the coffee grounds residue into the removable container from the grinding component, a region between the grinding component and the container, or both, when the knocker system is actuated.

14. The apparatus of claim 1, further comprising: an intelligent drive system configured to drive the grinding component, wherein the intelligent drive system utilizes feedback during a grinding process so that the apparatus produces a batch of the coffee grounds.

15. The apparatus of claim 1, further comprising: a grinds chamber surrounding at least a portion of the grinding component, wherein the grinds chamber defines a cross-sectional shape that is asymmetrical.

16. The apparatus of claim 15, wherein the grinding component includes a pair of circular burrs configured to rotate with respect to each other to grind the coffee beans therebetween, and wherein at least one of the circular burrs is mounted within the apparatus by fasteners that are asymmetrically arranged with respect to a vertical axis of the apparatus.

17. The apparatus of claim 16, wherein the cross-sectional shape of the grinds chamber includes a gradual downward slope on an intake side of a grinding region and a sharply rising slope on an exit side of the grinding region.

18. An apparatus, comprising: a housing configured to receive coffee beans; a grinding component located within the housing and configured to grind the coffee beans received in the housing into coffee grounds; a removable container located beneath the grinding component and configured to receive the coffee grounds dispensed from the grinding component, wherein the removable container includes one or more sides, a bottom, and a first magnetic component; a base located beneath the grinding component and configured to support the removable container at an upper surface thereof, wherein the base includes a second magnetic component that is configured to interact with the first magnetic component to align automatically the removable container with respect to a dispensing region when the removable container is placed atop the base; an auger configured to rotationally drive the grinding component, wherein the auger includes an outer thread that forces the coffee beans through the grinds chamber when the auger rotates; and a grinds chamber housing around at least a portion of the grinds chamber, wherein the grinds chamber housing includes a protective shoulder that covers a lead-in portion of the outer thread such that the coffee beans do not contact the lead-in portion during a grinding process.

19. A coffee grinder, comprising: a grinding component configured to grind coffee beans received therein into coffee grounds; a removable container located beneath the grinding component and configured to receive the coffee grounds dispensed from the grinding component, wherein the removable container includes one or more sides, a bottom having a bottom outer surface that is substantially flat in all directions, and a first magnetic component embedded within the removable container at the bottom surface; and a base located beneath and spaced apart from the grinding component and configured to support the removable container at an upper surface thereof that is substantially flat in all directions, wherein the base includes a second magnetic component embedded within the base beneath the upper surface, wherein the removable container and the base define geometries that facilitate the ability of the removable container to slide across the flat upper surface of the base horizontally in all directions, and wherein the second magnetic component is configured to interact with the first magnetic component to align automatically the removable container with respect to a dispensing region when the removable container is placed atop the base.

* * * * *